US005543887A

United States Patent [19]
Akashi

[11] Patent Number: 5,543,887
[45] Date of Patent: Aug. 6, 1996

[54] DEVICE FOR DETECTING LINE OF SIGHT

[75] Inventor: Akira Akashi, Yokohama, Japan

[73] Assignee: Canon Kabushiki Kaisha, Tokyo, Japan

[21] Appl. No.: 141,613

[22] Filed: Oct. 27, 1993

[30] Foreign Application Priority Data

Oct. 29, 1992 [JP] Japan ................................. 4-291727
Oct. 29, 1992 [JP] Japan ................................. 4-291728

[51] Int. Cl.$^6$ ........................................... G03B 7/00
[52] U.S. Cl. .................................. 354/410; 354/62
[58] Field of Search ................................ 354/410, 400, 354/402, 195.1, 62

[56] References Cited

U.S. PATENT DOCUMENTS

| | | | |
|---|---|---|---|
| 3,712,716 | 1/1973 | Cornsweet et al. | 351/7 |
| 4,973,149 | 11/1990 | Hutchinson | 351/210 |
| 5,036,347 | 7/1991 | Tsunekawa et al. | 354/400 |
| 5,182,443 | 1/1993 | Suda et al. | 250/201.2 |
| 5,280,312 | 1/1994 | Yamada et al. | 351/211 |
| 5,327,191 | 7/1994 | Shindo et al. | 354/410 |
| 5,335,035 | 8/1994 | Maeda | 354/219 |

FOREIGN PATENT DOCUMENTS

| | | |
|---|---|---|
| 1-241511 | 9/1989 | Japan . |
| 4-347128 | 12/1992 | Japan . |
| 4-347131 | 12/1992 | Japan . |

*Primary Examiner*—Russell E. Adams
*Attorney, Agent, or Firm*—Fitzpatrick, Cella, Harper & Scinto

[57] ABSTRACT

A device is provided device for detecting the line of sight of an observer, based on the positions of the Purkinje's image and of the center of the pupil circle. The device is capable, in determining the pupil circle from the pupil edge data collected from the image sensor, of preventing erroneous estimation of the pupil circle resulting from false noise data, by partially excluding or adding the edge data in the estimation process of the pupil circle and evaluating the reliability of the obtained estimated circle.

75 Claims, 15 Drawing Sheets

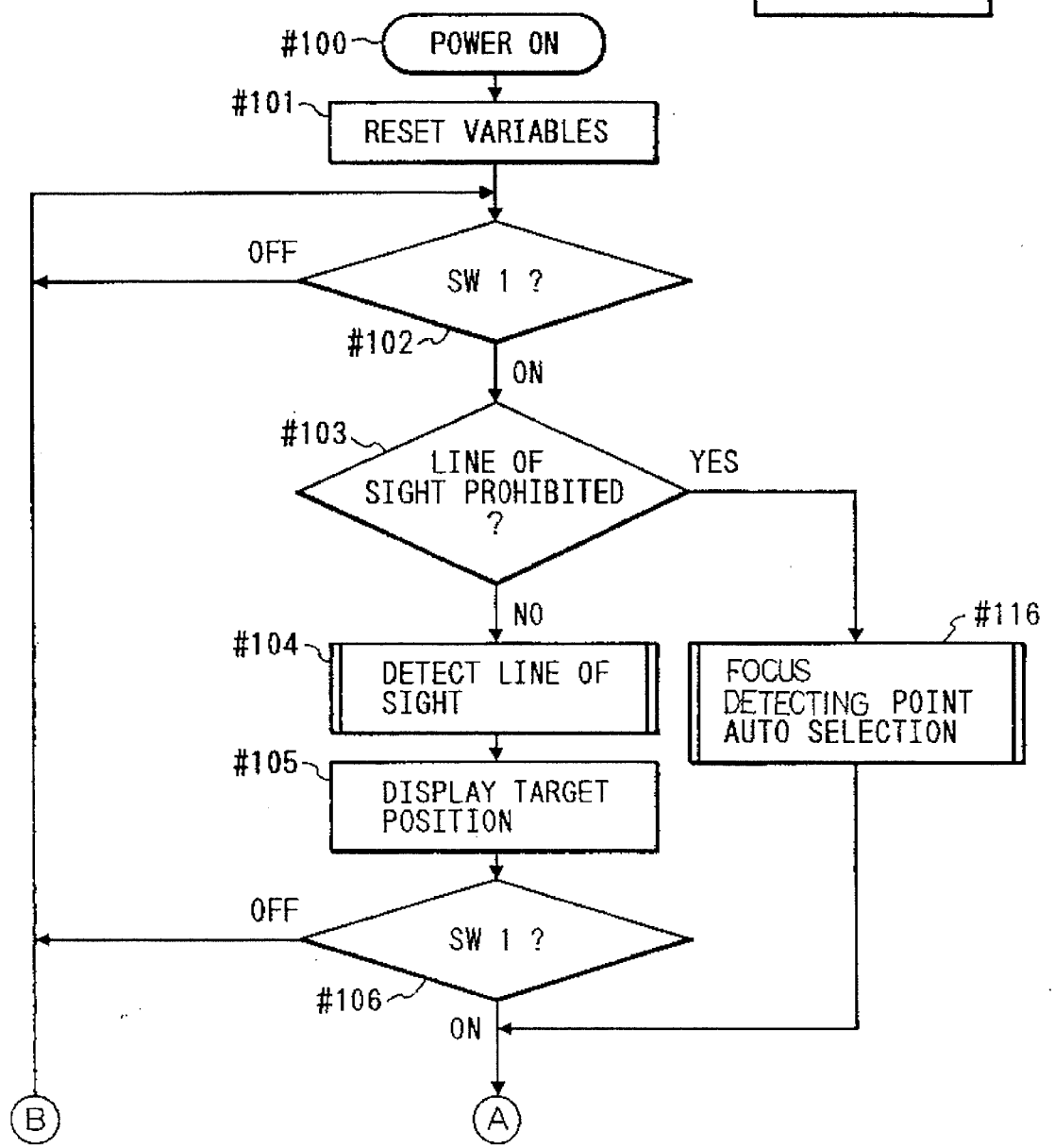

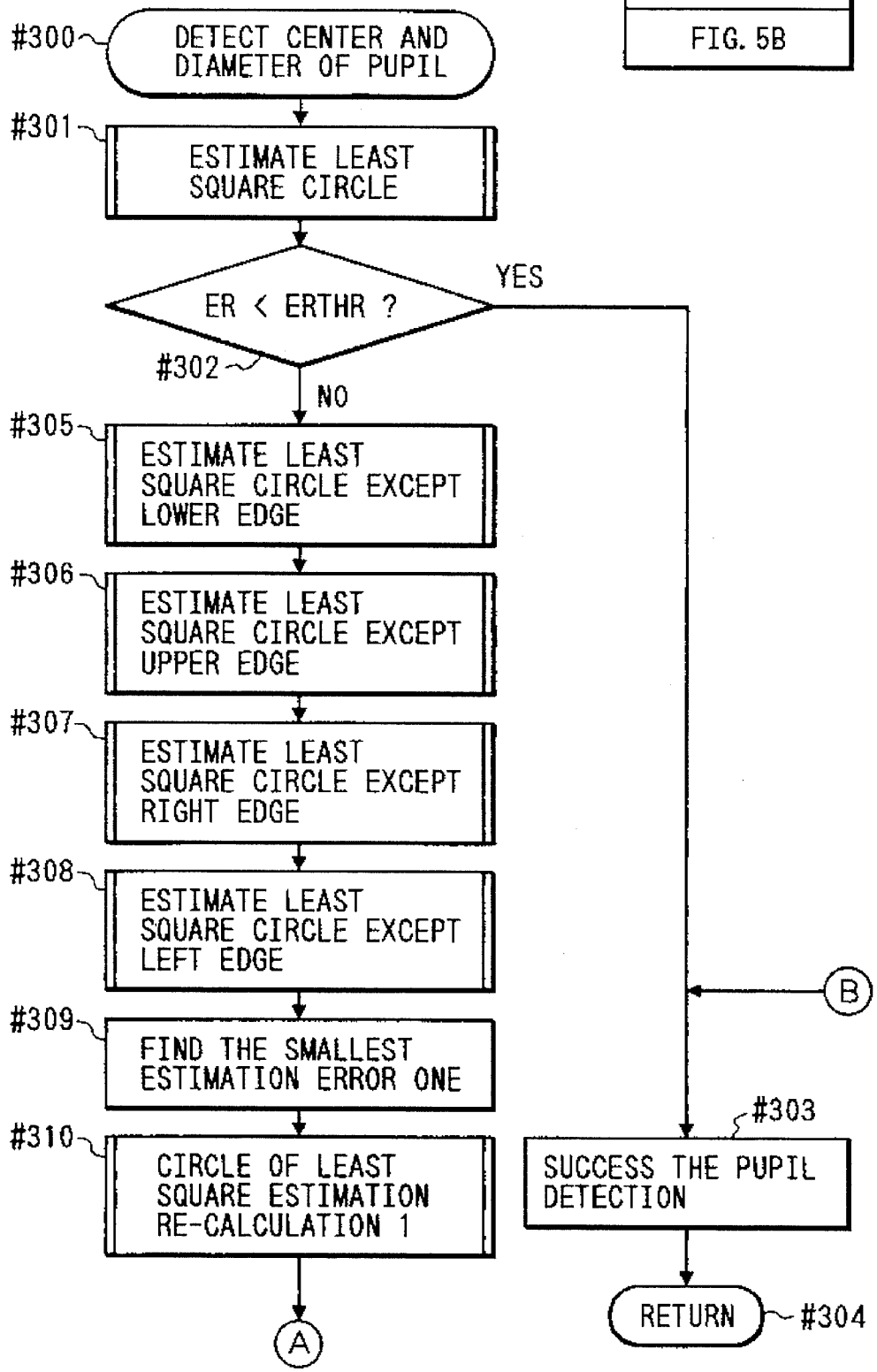

DEVICE FOR DETECTING LINE OF SIGHT

BACKGROUND OF THE INVENTION

1. Field of the Invention

The present invention relates to a device for detecting the line of sight of the observer, utilizing a reflected image of the eyeball obtained by illuminating the eyeball surface of the observer.

2. Related Background Art

There have been proposed various devices for detecting the position in the viewing field, observed by the observer, or so-called line of sight thereof, such as the eye camera.

For example, the U.S. Ser. No. 327,784 discloses a device for projecting a parallel light beam from a light source to the frontal part of the eyeball of the observer, and determining the line of sight by means of the corneal reflected image and the image position of the pupil, formed by the light reflected from the cornea.

FIGS. 10A, 10B and 11 show the principle of detection of the line of sight.

In the following there will be given an explanation on a sight line detecting device, applied to a camera.

At first referring to FIG. 11, infrared light-emitting diodes (IRED's) 13a, 13b are positioned in the x-direction substantially symmetrically with respect to the optical axis i of a light-receiving lens 12, and respectively illuminate the eyeball of the photographer in diffuse manner.

The infrared light emitted from the IREDs 13a, 13b illuminates the cornea 16 of the eyeball 15. Corneal reflected images d, e formed by a part of the infrared light reflected at the surface of the cornea 16, are refocused by the light-receiving lens 12 at positions d', e' on an image sensor 14.

Also the image of the pupil of the eyeball illuminated by the IRED's is formed on the image sensor 14. The center C of the circular boundary between the pupil and the iris (said boundary being called pupil circle), having an x-coordinate $x_c$, has an unrepresented x-coordinate $x_c'$ on the image sensor 14.

FIG. 10A shows the eyeball image projected onto the image sensor 14 shown in FIG. 2, and FIG. 10B shows the image signal output along a line (I)–(I') in FIG. 10A.

In FIG. 10A there are shown so-called white 50 of the eyeball, a pupil 51, and corneal reflected images 52a, 52b of a pair of IREDs.

Said corneal reflected image is called Purkinje's image.

In the signal 60 shown in FIG. 10B, two maxima correspond to the paired Purkinje's images.

Referring again to FIG. 11, since the x-coordinate of the center of the corneal reflected images d, e coincides with the x-coordinate $x_0$ of the center O of curvature of the cornea 16, the rotation angle θ of the optical axis k of the eyeball approximately satisfies a relation:

$$(A1*L_{OC})* \sin \theta \equiv xc-(xd+xe)/2 \tag{1}$$

wherein Xd, Xe are X-coordinates of the positions d, e where the corneal reflected images are generated, $L_{OC}$ is a standard distance from the center O of curvature of the cornea 16 to the center C of the pupil 19, and A1 is a coefficient representing individual fluctuation on said distance $L_{OC}$. Consequently, in a sight line calculating device, the rotation angle θ of the optical axis k of the eyeball can be determined by detecting the positions of feature points (corneal reflected images d, e and center C of the pupil) projected on the image sensor. In this operation, the equation (1) is re-written as:

$$\beta(A1*L_{OC})*\sin \theta \equiv xc'-(xd'+xe')/2 \tag{2}$$

wherein β stands for a magnification determined by the position of the eyeball with respect to the light-receiving lens 12, and is practically determined as a function of the distance |xd'−xe'| of the corneal reflected images. Also the rotation angle 74 of the eyeball 15 is re-written as:

$$\theta \equiv \text{ARCSIN} \{xc'-xf')/\beta/ (A1 * L_{OC})\} \tag{3}$$

wherein:

$$xf' \equiv (xd'+xe')/2.$$

Since the optical axis k of the eyeball of the photographer does not coincide with the line of sight, the line θH of sight of the photographer in the horizontal direction can be determined by an angular correction δ between the optical axis of the eyeball and the line of sight, once the rotation angle θ of the optical axis k of the eyeball in the horizontal direction is calculated. Taking a coefficient B1 for the individual fluctuation for the correction angle δ between the optical axis k of the eyeball and the line of sight, line θH of sight of the photographer in the horizontal direction can be given by:

$$\theta H=\theta \pm (B1*\delta) \tag{4}$$

wherein the sign ± is + or − respectively if the photographer looks at the device with the left eye or the right eye, when the rotation angle to the right with respect to the photographer is taken as positive.

FIG. 11 shows the case of the rotation of the eyeball of the photographer in the Z-X plane (for example horizontal plane), but the detection is similarly possible also in case of rotation of the eyeball in the Z-Y plane (for example vertical plane). However, since the vertical component of the line of sight of the photographer coincides with the vertical component θ' of the optical axis of the eyeball, the line of sight θV in the vertical direction is represented by:

$$\theta V=\theta'.$$

Based on the sight line data θH and θV, the coordinates (Xn, Yn) looked at by the photographer on the focusing screen in the viewfinder field is given by:

$$\begin{aligned} Xn &\equiv m * \theta H \\ &\equiv m * [\text{ARCSIN}\{(xc' - xf')/\beta/(A1 * L_{OC})\} \\ &\quad \pm (B1 * \delta)] \\ Yn &\equiv m * \theta V \end{aligned} \tag{5}$$

wherein m is a constant determined by the finder optical system of the camera.

The coefficients A1, B1 for correcting the individual fluctuation of the eyeball of the photographer can be determined by letting the photographer watch an index provided in a predetermined position in the viewfinder and matching the position of the watched point calculated according to the equation (5) with the position of said index.

The calculation for determining the line of sight of the photographer and the watched point is executed by the software of a microcomputer of the sight line processing device, according to the foregoing equations.

After the determination of said coefficients for correcting the individual difference in the line of sight, the position, on the focusing screen, of the line of sight of the photographer looking at the viewfinder is calculated according to the equation (5), and thus obtained information on the line of sight is utilized for focusing control of the phototaking lens or for exposure control.

The actual determination of the line of sight is achieved by detecting the Purkinje's image and the pupil circle mentioned above by processing the eyeball image on the image sensor with the microcomputer and utilizing the positional information thus obtained.

A specific method is already proposed in the Japanese Patent Application No. 3-121097. According to this method, the pupil circle is determined by reading the eyeball image signal from the image sensor, extracting the difference in luminance at the boundary between the pupil and the iris as signal edge, memorizing the coordinates of such signal edges, and, after the readout of the eyeball image, estimating a circle from the plural coordinates of the pupil edge by the least square method.

FIG. 12A shows an eyeball image, in which the Purkinje's image is omitted. Plural white circles positioned around the pupil 51 represent pupil edge, and a numeral 70-1 stands for one of such edge positions.

FIG. 12B shows the pupil edge shown in FIG. 12A, and dots in an area 71 are those extracted as the upper edge of the pupil circle. Also areas 72, 73, 74 respectively show the lower, left, and right edges.

A circle 75 is estimated by the least square method from these edge data, as shown in FIG. 12C, and has coordinates (xc, yc) of the center and a radius $r_c$.

SUMMARY OF THE INVENTION

One aspect of the present invention is to achieve exact detection of the line of sight by selecting specified ones from plural information on the boundary between the pupil and the iris in an eyeball and estimating, from said specified information on the boundary, the external shape of said pupil.

Another aspect of the present invention is to achieve exact detection of the line of sight by estimating the external diameter of the pupil of an eyeball from plural information on the boundary between said pupil and the iris, and varying the principle of selecting the specified information on the boundary from the plural boundary information, based on the external diameter.

DETAILED DESCRIPTION OF THE PREFERRED EMBODIMENTS

Figure 1:
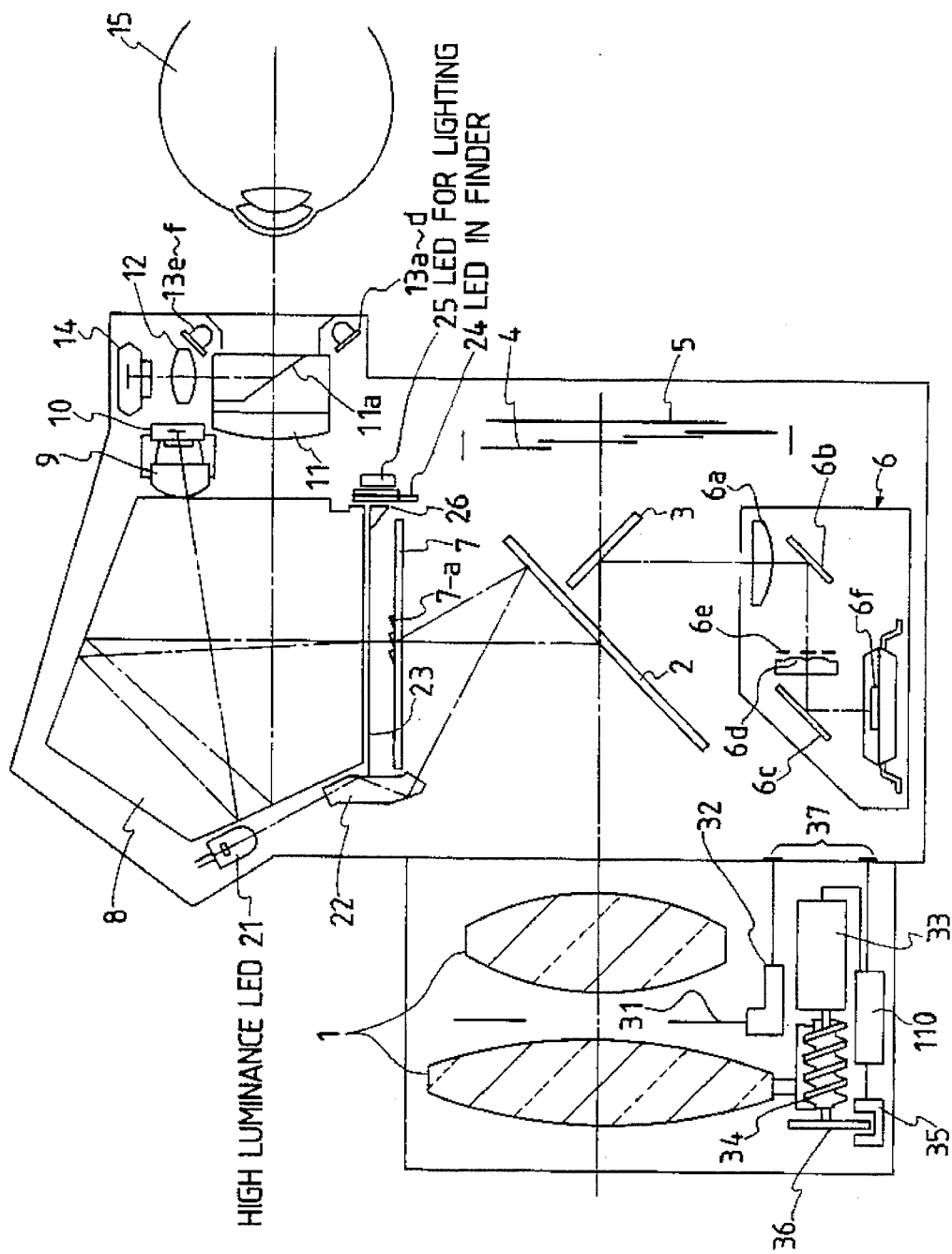
FIG. 1 is a schematic view of a camera in which the present invention can be effectively applied.

FIG. 1 is a schematic view of an embodiment of the present invention, applied to a single lens reflex camera.

In FIG. 1 there are shown a phototaking lens 1, illustrated with two lenses for the purpose of simplicity but in practice composed of a larger number of lenses; a main mirror 2 positioned obliquely in the phototaking optical path (lowered state) or retracted therefrom (elevated state) respectively in a state for observing the object image by the finder system or in a state of phototaking; a sub mirror 3 for reflecting the light beam, transmitted by the main mirror 2, downwards toward a focus detecting device 6 positioned in the lower part of the camera body; a shutter 4; a photosensitive member composed of a silver halide-based film, a solid-state image pickup device such as a CCD or a MOS sensor, or an image pickup tube; and a focus state detecting device 6 composed of a field lens 6a positioned close to the focal plane, mirrors 6b, 6c, a secondary imaging lens 6d, a diaphragm 6e and plural CCD line sensors 6f.

The focus state detecting device 6 of the present embodiment employs the known phase difference method. There are further provided a focusing screen 7 positioned at the anticipated focal plane of the phototaking lens 1; a pentagonal roof-shaped prism 8 for deflecting the finder optical path; and an imaging lens 9 and a photosensor 10 for measuring the object luminance in the viewing field. The focusing screen 7 and the photosensor 10 are positioned mutually conjugate with respect to the imaging lens 9, through the optical path reflected by the pentagonal roof-shaped prism 8.

Behind the exit face of said pentagonal prism 8 there is provided an eyepiece lens 11 provided with a light splitter 11a, for observation of the focusing screen 7 by the eye of the photographer. Such light splitter 11a is composed, for example, of a dichroic mirror transmitting the visible light and reflecting the infrared light.

There are further provided a light receiving lens 12; an image sensor 14 composed of two-dimensionally arranged photosensor arrays such as CCD, and so positioned as to be conjugate approximately with the pupil of the eye 15 of the photographer in a predetermined position, with respect to said light receiving lens 12; and infrared light-emitting diodes 13a –13f constituting light sources.

There is also provided a superimposing LED 21 of high luminance, observable even among highly bright objects, and the light emitted therefrom is guided through a projecting prism 22, then reflected by the main mirror 2, deflected perpendicularly by a microprism array 7a provided in a display area of the focusing screen 7, further guided through the pentagonal prism 8 and the eyepiece lens 11 and reaches the eye 15 of the photographer.

Said microprism arrays 7a are formed as frames in five positions corresponding to the focus detecting areas of the focusing screen 7, and said frames are respectively illuminated by five superimposing LED's 21 (LED-L1, LED-L2, LED-Cm, LED-R1, LED-R2).

A viewing field mask 23 is provided for defining the finder viewing field. A liquid crystal display (LCD) 24 is provided for displaying phototaking information, in an area outside the finder viewing field, and is illuminated by an LED 25.

The light transmitted by the LCD 24 is guided by a triangular prism 26 into the finder viewing field and provides a display 207 outside the viewing field of the finder, whereby the photographer can recognize the phototaking information.

There are further provided a diaphragm 31 incorporated in the phototaking lens 1; a diaphragm drive device 32 including a diaphragm drive circuit 111 to be explained later; a lens driving motor 33; a lens driving member 34 composed for example of a driving gear; a photocoupler 35 for detecting the rotation of a pulse disk 36 linked with the lens driving member 34 and transmitting the obtained information to a lens focusing circuit 110, which drives the lens driving motor based on said information and the information on the lens drive amount transmitted from the camera body, thereby moving the phototaking lens 1 to the in-focus position; and a known lens mount contact 37 constituting an interface between the camera and the phototaking lens.

Figure 2:
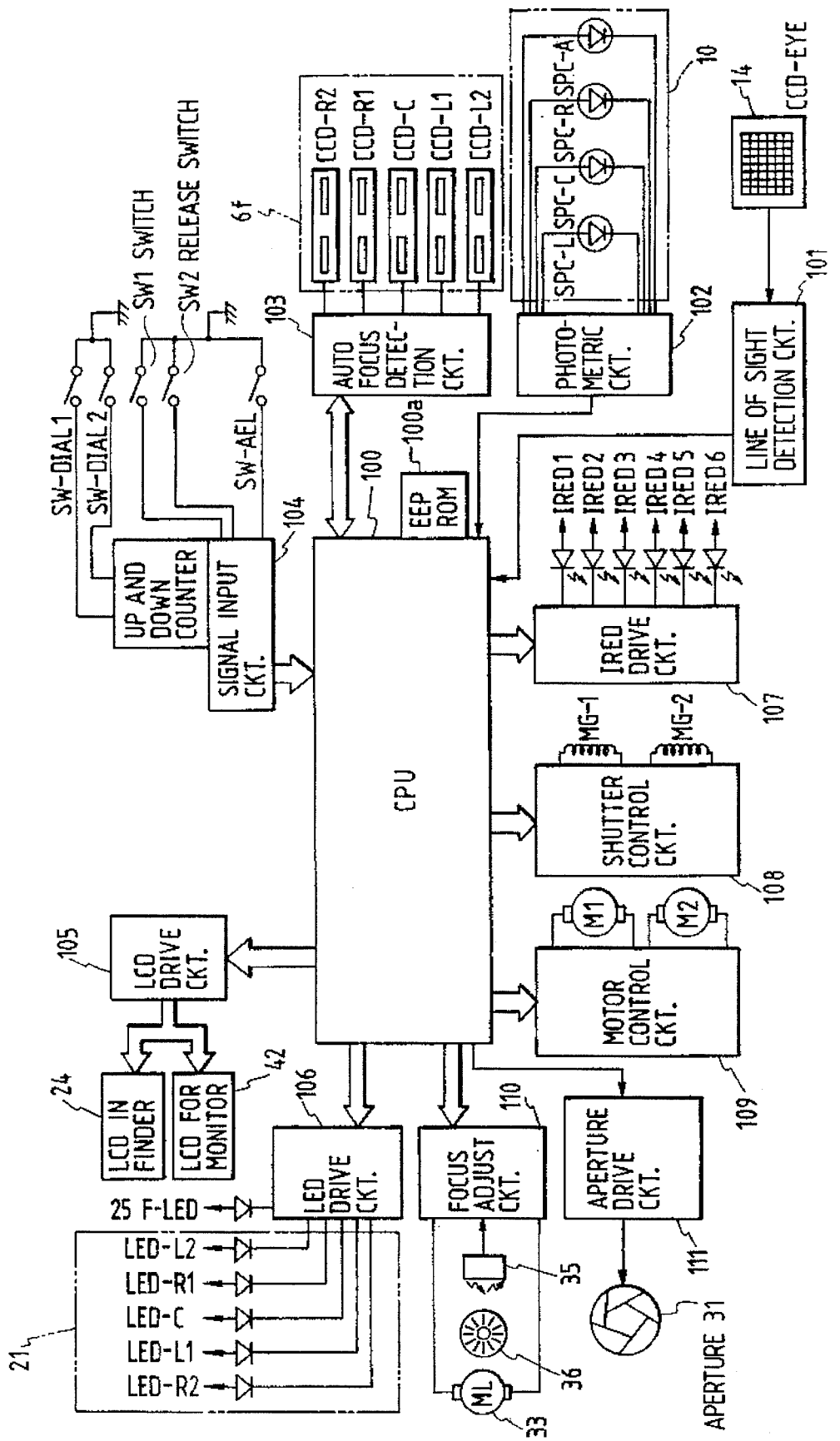
FIG. 2 is a circuit diagram of the camera shown in FIG. 1.

FIG. 2 is a circuit diagram of the electric circuits incorporated in the camera, wherein same components as those in FIG. 1 are represented by same numbers.

A central processing unit (CPU) 100 of a microcomputer incorporated in the camera body is connected to a sight line detecting circuit 101, a light metering circuit 102, an auto focus detection circuit 103, a signal input circuit 104; an LCD drive circuit 105, an LED drive circuit 106, an IRED drive circuit 107, a shutter control circuit 108 and a motor control circuit 109. It also effects signal exchange with a focusing circuit 110 and a diaphragm drive circuit 111 provided in the phototaking lens, through mount contacts 37 shown in FIG. 1.

An EEPROM 100a, attached to the CPU 100, serves as a memory for storing the correction data for correcting the individual difference in the line of sight.

The sight line detecting circuit 101 effects A/D conversion on the output of the eyeball image from the image sensor (CCD-EYE) 14 and transmits the obtained image information to the CPU 100, which extracts the feature points of the eye image, required for the detection of the line of sight, according to a predetermined algorithm, and calculates the line of sight of the photographer, based on the positions of said feature points.

The light metering circuit 12 effects amplification, logarithmic compression and A/D conversion on the outputs of photosensors 10, and transmits the obtained luminance information of each sensor to the CPU 100. Said photosensors 10 are composed of four photodiodes SPC-L, SPC-C, SPC-R and SPC-A for measuring the luminance of four areas.

The line sensors 6f shown in FIG. 2 are composed of five CCD line sensors CCD-L2, CCD-L1, CCD-C, CCD-R1 and CCD-R2 respectively corresponding to five focus detecting points in the viewing field.

The automatic focus detecting circuit 103 effects A/D conversion of the voltages obtained from said line sensors 6f for transfer to the CPU 100. There are also provided a switch SW-1 to be turned on by a first stroke depression of a shutter release button thereby initiating light metering, auto focusing, sight line detection etc., a release switch SW-2 to be turned on by a second stroke depression of the shutter release button, an AE locking switch SW-AEL to be turned on by the depression of an AE locking button, and dial switches SW-DIAL1, SW-DIAL2 provided in an unrepresented electronic dial and connected to an up-down counter of the signal input circuit 104, for detecting the amount of rotation of said electronic dial.

The known LCD drive circuit 105, for driving the liquid crystal display unit LCD, provides displays simultaneously on the monitor LCD 42 and the finder LCD 24, of the diaphragm value, shutter speed, selected phototaking mode etc. according to signals from the CPU 100. The LED drive circuit 106 controls the lighting of the illuminating LEDs 25 and the superimposing LEDs 21. The IRED drive circuit 107 selectively turns on the infrared LEDs 13a–13f according to the situation.

The shutter control circuit 108 controls a solenoid MG-1 for releasing the leading shutter curtain and a solenoid MG-2 for releasing the trailing shutter curtain, thereby exposing the photosensitive member to a predetermined amount of light. The motor control circuit 109 serves to control a motor M1 for advancing and rewinding the photographic film, and a motor M2 for moving the main mirror 2 and charging the shutter 4. A shutter releasing sequence is executed by said shutter control circuit 108 and said motor control circuit 109.

In the following there will be explained the functions of the camera equipped with the sight line detecting device, with reference to a flowchart shown in FIGS. 3A and 3B.

When the camera is shifted from the inactive state to a predetermined phototaking mode by the rotation of an unrepresented mode dial, the power supply of the camera is turned on (#100), and the variables used for the detection of the line of sight in the CPU 100 are reset (#101).

Then the camera waits until the switch SW-1 is turned on by the depression of the shutter release button (#102). When the signal input circuit 104 detects that said switch SW1 is turned on by the depression of the shutter release button, the CPU 100 confirms the state of the sight line detecting circuit 101 (#103).

If the sight line inhibition mode is selected in this state, a focus detecting point is selected by a focus detecting point auto selection subroutine (#116), without execution of the detection of the line of sight, namely without utilizing the sight line information. Then the auto focus detecting circuit 103 executes the focus detection at said focus detecting point (#107).

In this manner there are provided a phototaking mode for selecting the focus detecting point without the sight line information (sight line-inhibited auto focusing mode) and a mode for selecting the focus detecting point with the sight line information (sight line-assisted auto focusing mode), which can be arbitrarily selected by the photographer.

For such automatic selection of the focus detecting point, there can be considered several algorithms, but advantageously employed is the near point-preferential algorithm with weighting on the central distance measuring point. The content of such algorithm will not be explained further since it is not directly related to the present invention.

On the other hand, if the sight line detection mode is selected, there is executed the detection of the line of sight (#104).

The line of sight detected by the sight line detecting circuit 101 is converted into the coordinates of the watched point on the focusing screen 7. The CPU 100 selects a focus detecting point close to said coordinates of the watched point, and sends a signal to the LED drive circuit 106 to cause a superimposing LED 21 to intermittently flash the mark of said focus detecting point (#105).

If the photographer, upon seeing the display of the selected distance measuring point, recognizes that said focus detecting point is improper and turns off the switch SW1 by lifting the finger from the shutter release button (#106), the camera waits until the switch SW1 is turned on again (#102).

As the focus detecting point selected by the sight line information is informed to the photographer by intermittent flashing of the focus detecting point mark in the viewing field of the view finder, the photographer can confirm whether the point is selected matching his intention.

On the other hand, if the photographer, upon seeing the display of the focus detecting point selected according to the sight line information, continues to turn on the switch SW1 (#106), the auto focus detecting circuit 103 executes the focus detection for at least a focus detecting point, utilizing the detected sight line information (#107).

Then it is discriminated whether the focus detection is possible at the selected focus detecting point (#108), and, if not possible, the CPU 100 sends a signal to the LCD drive circuit 105 to cause the in-focus mark in the finder LCD 24 to intermittently flash, thereby informing the photographer of a warning that the focus detection is impossible (#118) until the switch SW1 is turned off (#119).

If the focus detection is possible but if the focus state of the focus detecting point selected according to the predetermined algorithm is not in-focus (#109), the CPU 100 sends a signal to the lens focusing circuit 110 thereby driving the phototaking lens 1 by a predetermined amount (#117). After said lens drive, the auto focus detecting circuit 103 effects the focus detection again (#107), thereby discriminating whether the phototaking lens 1 is in the in-focus state (#109).

If the phototaking lens 1 is in focus at the predetermined focus detecting point, the CPU 100 sends a signal to the LCD drive circuit 105 to turn on the infocus mark of the finder LCD 24, and another signal to the LED drive circuit 106 to effect the in-focus display on the focus detecting point 201 in the in-focus state (#110).

In this state, the intermittent flashing of the focus detecting point selected by the line of sight is turned off, but, since said focus detecting point often coincides with the focus detecting point of the in-focus display, the latter is turned on continuously in order to inform the photographer of the in-focus state. If the photographer, seeing the display of the in-focus state of the focus detecting point in the view finder, recognizes that said focus detecting point is improper and turns off the switch SW1 by lifting the finger from the shutter release button (#111), the camera waits until the switch SW1 is turned on again (#102).

On the other hand, if the photographer, upon seeing the display of the in-focus focus detecting point in the view finder, continues to turn on the switch SW1 (#111), the CPU 100 sends a signal to the light metering circuit 102 to effect the light metering (#112).

Then it is discriminated whether the switch SW2 is turned on by a further depression of the shutter release button (#113), and, if it is off, there is again confirmed the state of the switch SW1 (#111). On the other hand, if the switch SW2 is turned on, the CPU 100 sends signals to the shutter control circuit 108, motor control circuit 109 and diaphragm drive circuit 111.

At first the motor M2 is activated to lift the main mirror 2 and to close down the diaphragm 31, then the solenoid MG1 is energized to release the leading curtain of the shutter 4 thereby initiating the exposure. The aperture value of the diaphragm 31 and the exposure time of the shutter 4 are determined from the exposure value detected by the light metering circuit 102 and the sensitivity of the film 5. After the lapse of a predetermined shutter time (for example ½50 sec.), the solenoid MG2 is energized to release the trailing curtain of the shutter 4, thereby terminating the exposure. Upon completion of exposure of the film 5, the motor M2 is activated again to lower the mirror and to charge the shutter. At the same time the motor M1 is also activated to advance the film by a frame, whereby the shutter releasing sequence is terminated (#114). Thereafter the camera waits until the switch SW1 is turned on again (#102).

FIGS. 4 to 9 are flowcharts of the detection of the line of sight explained above.

Figure 3B:
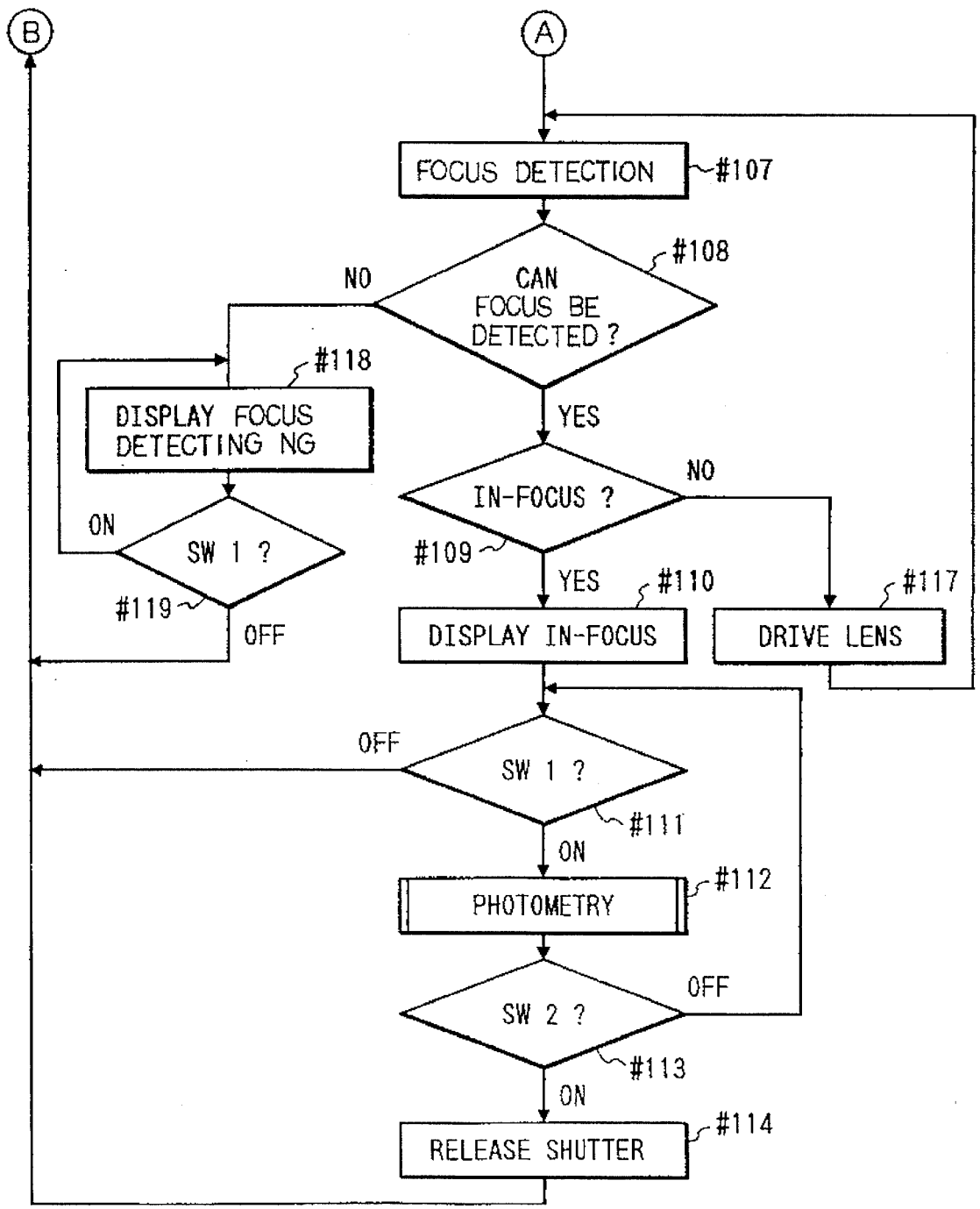
FIG. 3, which consists of FIGS. 3A and 3B, is a flowchart showing the function of the electrical circuit shown in FIG. 2.
Figure 4:
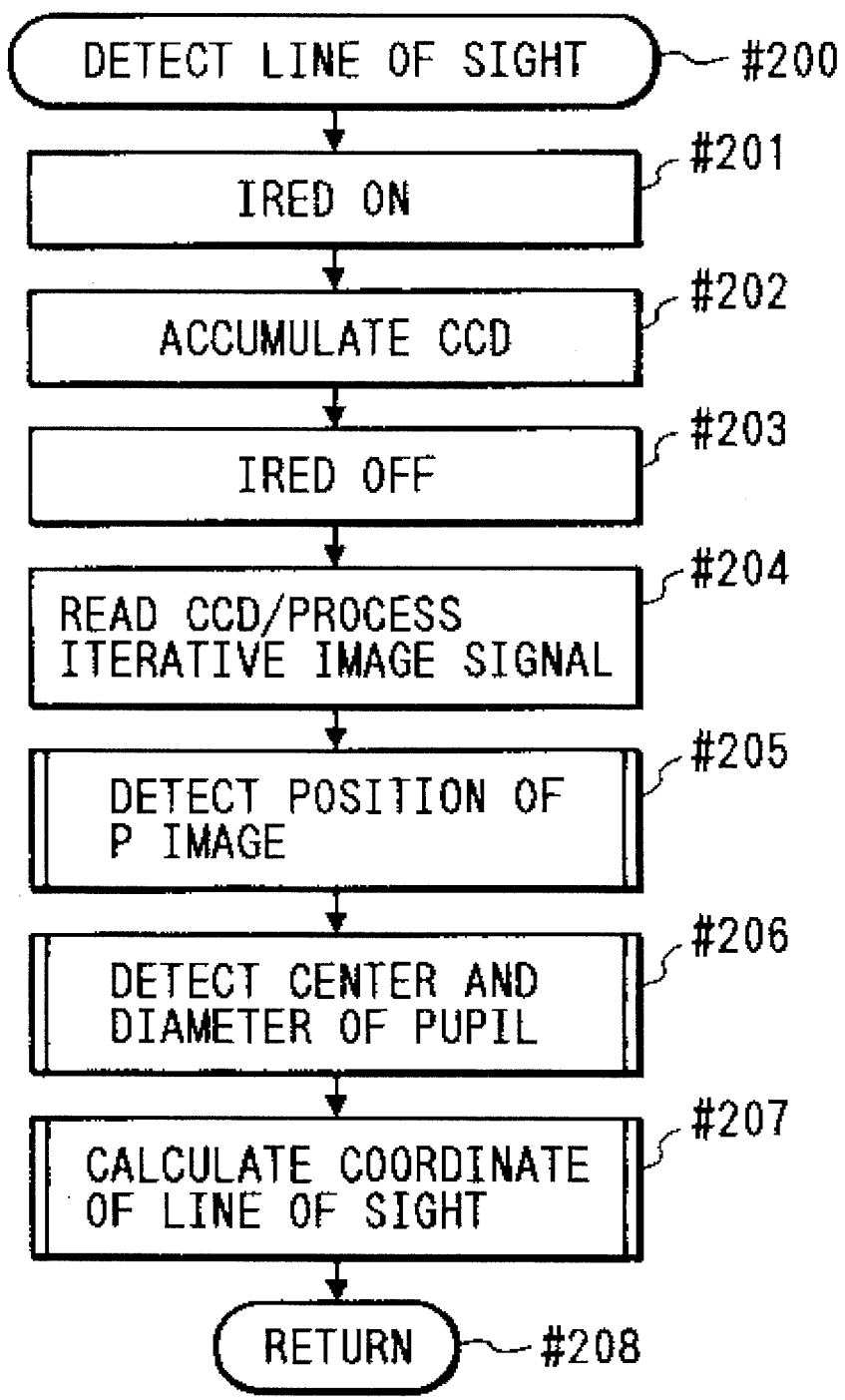
FIG. 4 is a flowchart showing the sequence of detection of the line of sight.

As explained in the foregoing, in response to a signal from the CPU 100, the sight line detecting circuit 101 executes the detection of the line of sight (#104 in FIGS. 3A and 3B).

At first the CPU 100 selects and turns on the infrared light-emitting diodes (IRED) of a suitable combination, from those 13a –13f for illuminating the eye of the photographer. Said selection is based on whether the camera is in the horizontal or vertical position, detected by an unrepresented position switch, and whether the photographer wears eyeglasses.

Then the image sensor 14 effects the charge accumulation with a predetermined accumulation time (#202). Upon completion of said charge accumulation, the IREDs are turned off (#203).

The CPU 100 reads the eyeball image of the photographer from the image sensor 14 after said charge accumulation, and sequentially extracts the Purkinje's image and the feature points of the pupil (#204). The details of this process will not be explained further as they are described in the aforementioned Japanese Patent Application No. 3-121097.

Figure 10A:
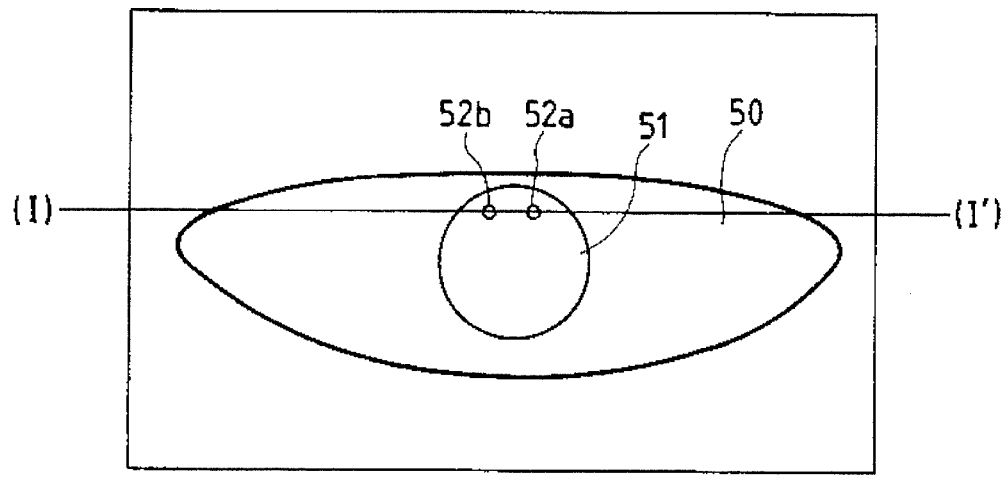
FIGS. 10A and 10B are views showing an example of the eyeball of the observer.
Figure 10B:
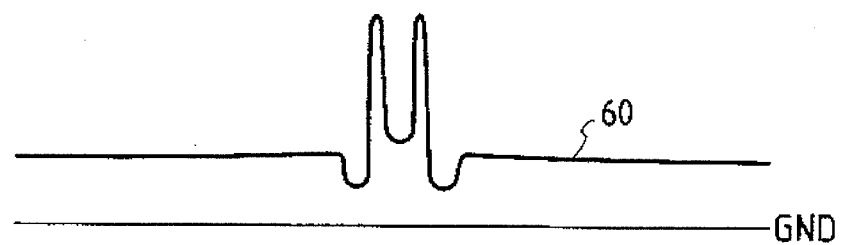
Figure 11:
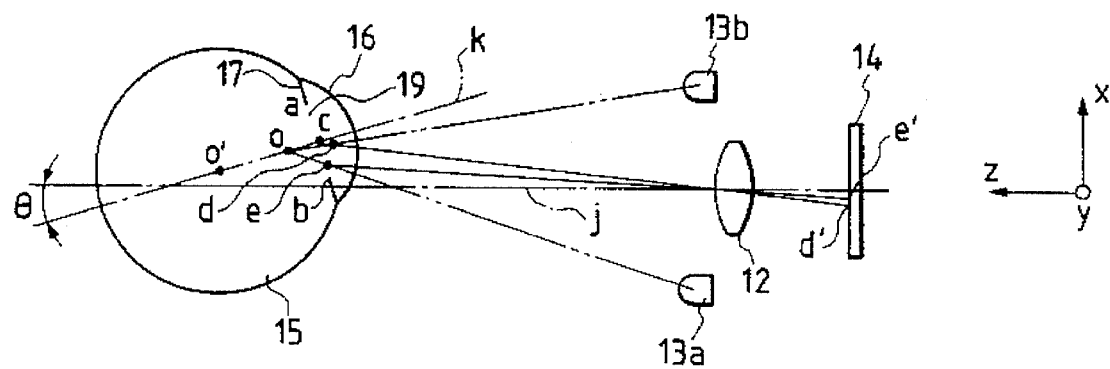
FIG. 11 is a view showing the principle of detection of the line of sight.
Figure 12A:
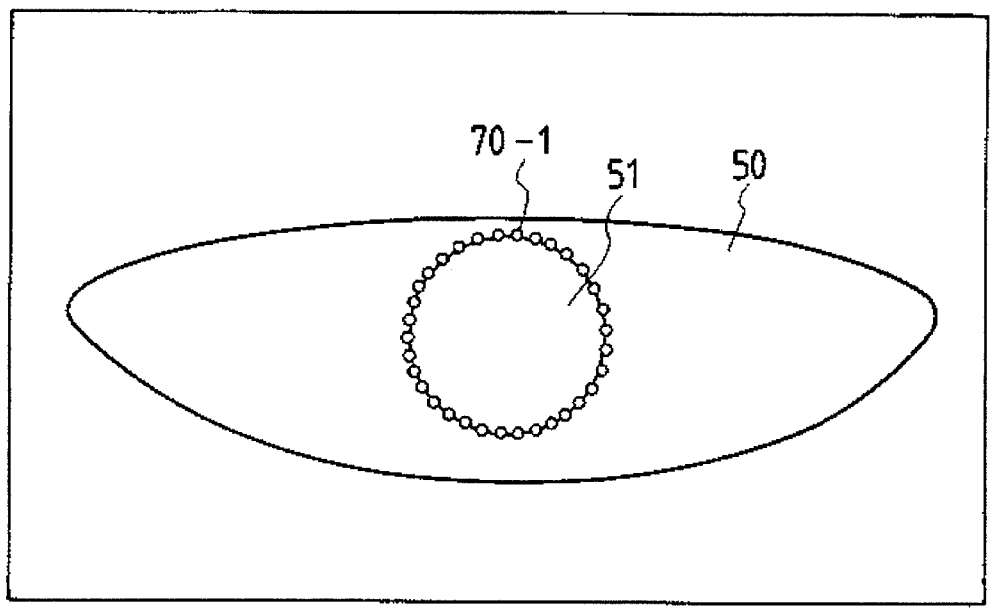
FIGS. 12A to 12C are views showing the ordinary detection of the pupil circle.
Figure 12B:
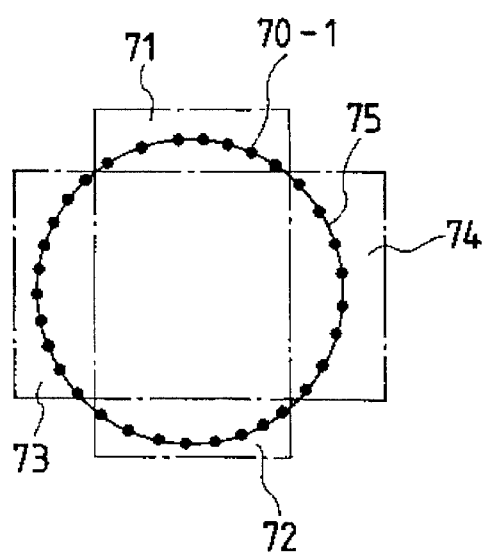
Figure 12C:
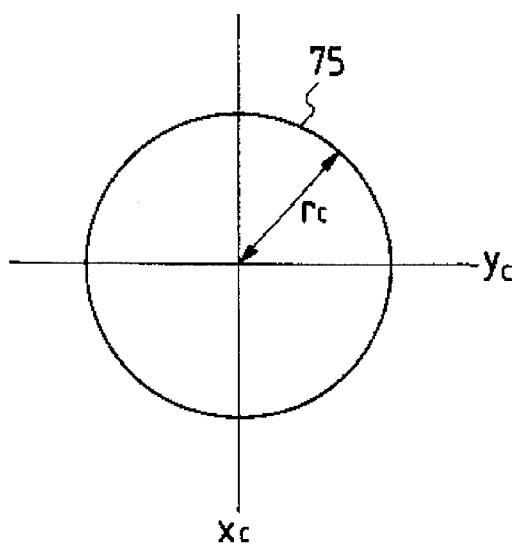

After the readout of the entire eyeball image and the extraction of the feature points of the pupil and the Purkinje's image, there are detected, based on this information, the positions of a set of Purkinje's images (#205). Since the Purkinje's image is a corneal reflected image of the illuminating IRED, it appears as a bright point with a high light intensity in the image signal, as exemplified by 52a, 52b in FIG. 10A. This feature allows to extract a set of the Purkinje's images and to determine the positions (Xd', Yd') (Xe', Ye') thereof.

Then, based on the coordinates of the pupil edge extracted in the successive processing in the step #204, there are detected the center (Xc', Yc') of the center of the pupil circle and the radius rc thereof (#206). This subroutine will be explained later in more detail.

If the positions of the Purkinje's image and of the pupil can be detected from the eyeball image of the photographer, the line of sight thereof or the coordinates of the watched point on the focusing screen can be calculated in the step #207 according to the equation (5), and the sight line detecting subroutine is thus terminated (#208).

Figure 5B:
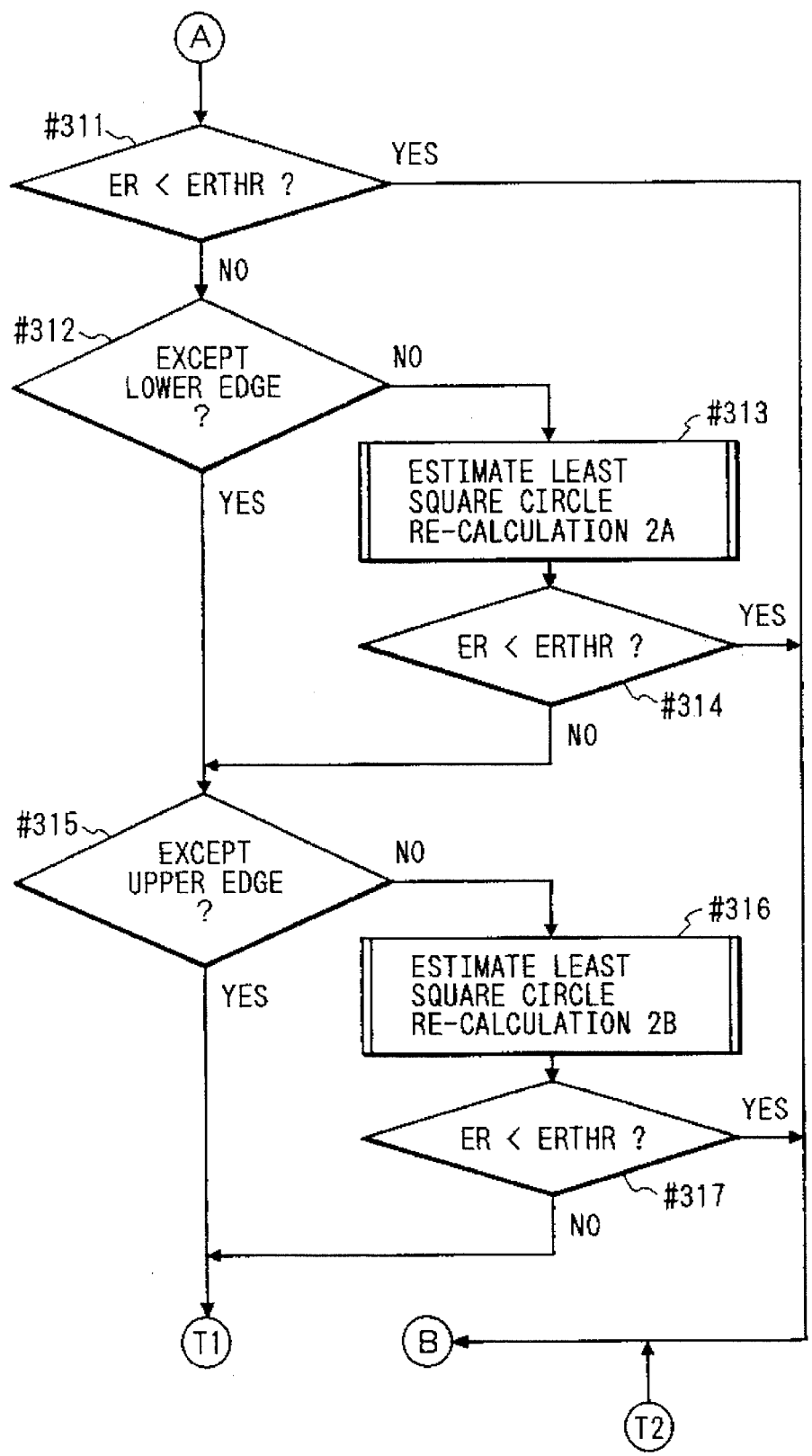
FIG. 5, which consists of FIGS. 5A and 5B, is a flowchart showing the sequence of detection of the pupil center and the pupil diameter in the flowchart shown in FIG. 4.

FIGS. 5A and 5B are flowcharts of the subroutine for detecting the center and diameter of the pupil. When this subroutine is called, steps #300 and #301 effect least square estimation of a circle, employing all the extracted pupil edge data. The basic calculating equations, disclosed in the aforementioned Japanese Patent Application No. 3-121097, are briefly explained in the following.

For n sets of coordinates $(x_1, y_1), (x_2, y_2), \ldots, (x_n, y_n)$ of the pupil edge, the least square estimation of a circle provides the coordinates $(x_c, y_c)$ of the center, radius $r_c$ and estimated error ER as follows:

$$xc = (W1 \cdot V2 - W2 \cdot W4 - (W6 - Y1 \cdot Z1) \cdot W3)/2 \quad (10)$$
$$\cdot (X2 \cdot V2 - W5 - W6 \cdot X1/n)$$

$$yc = (W2 \cdot V1 - W1 \cdot W4 - (W7 - X1 \cdot Z1) \cdot W3)/2 \quad (11)$$
$$\cdot (Y2 \cdot V1 - W5 - W7 \cdot Y1/n)$$

$$rc = \sqrt{(W3 - 2 \cdot ((xc \cdot X1 + yc \cdot Y1)/n) + xc^2 + yc^2)} \quad (12)$$

$$ERX = X4 - 4 \cdot xc \cdot X3 + 2(2 \cdot xc^2 + d) \cdot X2 - 4 \cdot xc \quad (13)$$
$$\cdot d \cdot X1 + Y4 - 4 \cdot yc \cdot Y3 + 2(2 \cdot yc^2 + d)$$
$$\cdot Y2 - 4 \cdot yc \cdot d \cdot Y1 + 2(Z4 - 2 \cdot xc \cdot Z3 - 2$$
$$\cdot yc \cdot Z2 + 4 \cdot xc \cdot yc \cdot Z1) + d^2 \cdot n$$

$$ER = \sqrt{(ERX/n)} \quad (14)$$

wherein:

$$X1 = \Sigma xi, \ X2 = \Sigma xi^2, \ X3 = \Sigma xi^3, \ X4 = \Sigma xi^4 \quad (15)-(18)$$

$$Y1 = \Sigma yi, \ y2 = \Sigma yi^2, \ Y3 = \Sigma yi^3, \ Y4 = \Sigma yi^4 \quad (19)-(22)$$

$$Z1 = \Sigma xi \cdot yi, \ Z2 = \Sigma xi^2 \cdot yi^2 \quad (23), (24)$$

$$Z3 = \Sigma xi \cdot yi^2, \ Z4 = xi^2 \cdot yi^2 \quad (25), (26)$$

Also:

$$V1 = X2 - X1^2/n \quad (27)$$

$$V2 = Y2 - Y1^2/n \quad (28)$$

$$W1 = X3 + Y3 \quad (29)$$

$$W2 = Y3 + Z3 \quad (30)$$

$$W3 = (X2 + Y2)/n \quad (31)$$

$$W4 = Z1 - X1 \cdot Y1/n \quad (32)$$

$$W5 = (Z1 - 2 \cdot X1 \cdot Y1/n) \cdot Z1 \quad (33)$$

$$W6 = X1 \cdot Y2 \quad (34)$$

$$W7 = X2 \cdot Y1 \quad (35)$$

$$d = xc^2 + yc^2 - rc^2 \quad (36)$$

The numerical calculations explained above allow to obtain the center $(x_c, y_c)$ of the circle, radius $r_c$ thereof and estimated least square error ER.

The estimated error ER can be theoretically represented by the foregoing equation, but in practice it is subjected to a correction by the pupil radius $r_c$. Said error ER is zero if all the edge data are exactly positioned on a circle, and becomes larger as the number of the edge data displaced from said circle increases or as the distance of such edge data from the circle increases. However, for a comparable number of edge data which are at a comparable distance from the true circle, said error ER tends to increase for a larger pupil radius.

For correcting such tendency, the error ER is corrected by the pupil radius $r_c$ in the following manner:

$$ER = ER \cdot (a \cdot r_c + b) \quad (37)$$

If a and b are respectively selected as −0.05 and about 1.5, the correction coefficient $a \cdot r_c + b$ becomes 1 when the pupil radius occupies 10 pixels on the image sensor, so that the ER remains uncorrected. If the eye of the photographer comes closer to the camera, or if the pupil is opened for example to $r_c = 20$, the correction coefficient $a \cdot r_c + b$ becomes 0.5, so that the error amount ER is corrected to a half. On the other hand, if the pupil radius becomes smaller, the error amount is corrected to a larger amount. For the above-mentioned values of a and b, the correction coefficient $a \cdot r_c + b$ becomes zero when the pupil radius grows to 30 pixels, but said coefficient may also be defined as 0.5 when the pupil radius $r_c$ is equal to or larger than 20 pixels.

Figure 7A:
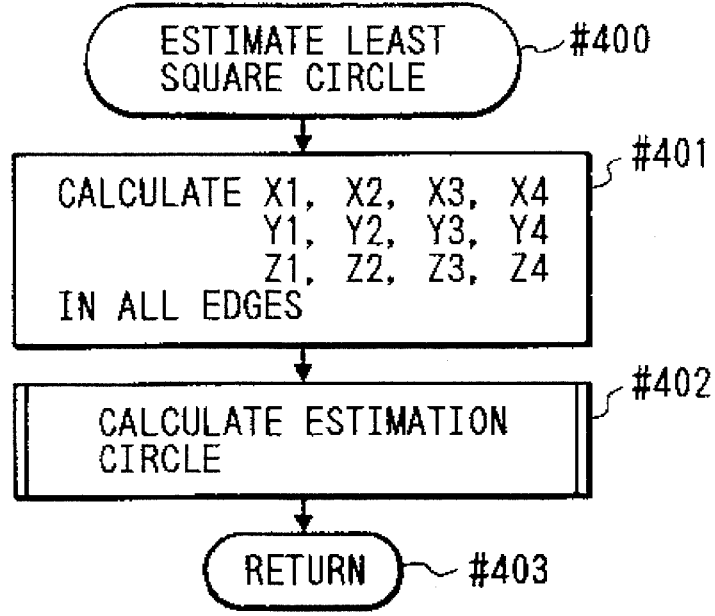
FIGS. 7A and 7B are flowcharts of the circle estimation by the least square method shown in FIGS. 5A and 5B.

FIG. 7A is a flowchart of the subroutine for least square circle estimation.

When said subroutine is called, steps #400 and #401 calculate the intermediate variables X1–X4, Y1–Y4 and Z1–Z4 of the least square method according to the equations (15) to (18), (19) to (22) and (23) to (26). Then the estimated circle is calculated (#402), and the subroutine is terminated (#403).

Figure 7B:
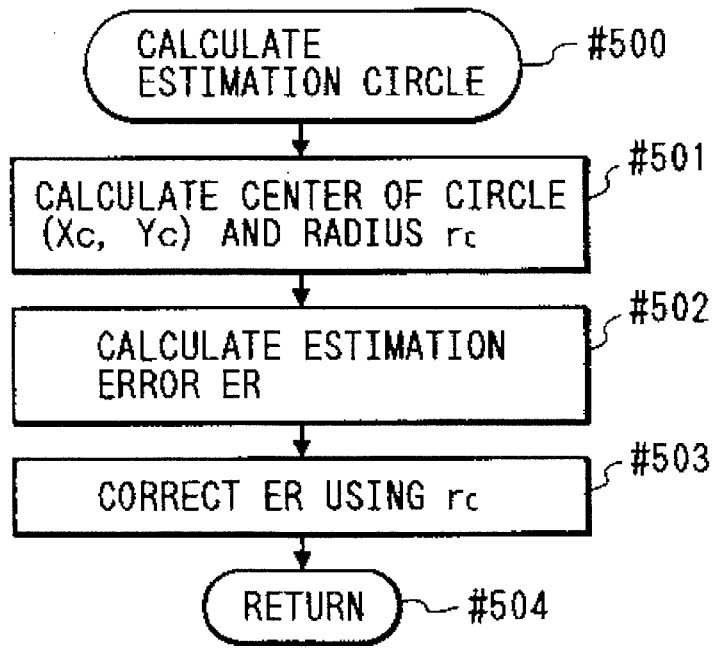

FIG. 7B is a flowchart of the subroutine for calculating the estimated circle. Steps #500 and #501 calculate the intermediate variables V1–W7 according to the equations (27) to (35). Then the coordinates (Xc, Yc) of the center of the estimated circle are calculated according to the equations (10) and (11), based on said variables. The radius $r_c$ of the estimated circle is calculated according to the equation (12), employing also the already calculated coordinates (Xc, Yc) of the center.

Then the estimated error ER is determined according to the equations (36), (13) and (14) (#502), and said error ER is corrected by the pupil radius $r_c$ according to the equation (37) (#503).

In this manner the center (Xc, Yc), radius $r_c$ and estimated error ER of the estimated circle are determined, and the subroutine is terminated (#504).

After the estimation of the pupil circle based on all the extracted pupil edge data and the determination of the coordinates (Xc, Yc) of the center, radius $r_c$ and estimated error ER of the pupil circle in the step #301, said estimated error ER is compared with an error threshold value ERTHR (#302).

The value of estimated error ER is normally 10 or less in case the pupil circle is estimated with a sufficient precision, said threshold value ERTHR is for example selected as 15 to 20.

In case of ER <ERTHR, namely if the estimated error is small, the detection of the pupil is regarded as successful (#303), and the present subroutine is terminated (#304).

In case of ER ≧ERTHR, or if the estimated error is large, the estimation is regarded as having failed by the false edge data, which are to be excluded in the following process.

At first a step #305 executes least square estimation of the circle, based on the data after exclusion of those extracted as the lower side of the pupil circle from all the extracted edge data, namely based on the edge data of the upper, right and left sides. Calculations in this case are similar to those explained above, except that the number of the edge data are less. The obtained coordinates of the center, radius and estimated error are memorized.

Similarly, steps #306, #307 and #308 execute the estimations of the pupil circle, respectively excluding the data of the upper, right and left edges, and the obtained results are similarly memorized.

Figure 8A:
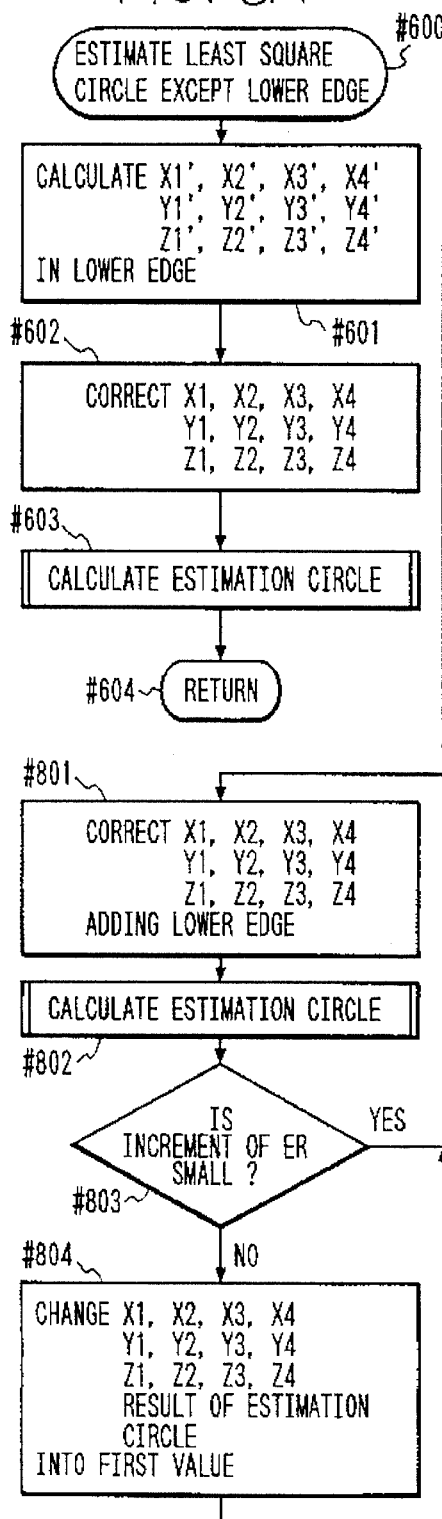
FIG. 8A is a flowchart of a least square estimation of the circle excluding the lower edge.

FIG. 8A is a flowchart of the subroutine for the least square circle estimation without the lower edge data.

At first a step #601 calculates variable X1'–X4', Y1'–Y4', Z1'–Z4' according to the equations (15)–(18), (19)–(22) and (23)–(26), solely employing the edge data extracted as the lower side of the pupil circle.

Then the intermediate variables X1–X4 calculated with all the edge data are corrected in the following manner:

$$X1 \rightarrow X1-X1' \tag{38}$$

$$X2 \rightarrow X2-X2' \tag{39}$$

$$X3 \rightarrow X3-X3' \tag{40}$$

$$X4 \rightarrow X4-X4' \tag{41}$$

Since the variables X1–X4 are linear variables as will be apparent from the equations (15)–(18), X1–X4 obtained from the equations (38) to (41) are based on the edge data excluding the lower edge. The above-explained calculations of the variables X1–X4, instead of calculations anew, are to shorten the process of calculation.

The intermediate variables Y1–Y4 and Z1–Z4 are also similarly corrected (#602). Thereafter the estimated circle is calculated (#603), whereby obtained is the estimated result based on the edge data excluding the lower edge.

The estimation of the pupil circle excluding the upper, right or left edge can be executed in the identical manner, except for the difference in the edge data to be excluded, and the flowcharts and the description of the process will therefore be omitted.

Again referring to the flow shown in FIGS. 5A and 5B, after the estimations of the pupil circle respectively excluding the edge data of the lower, upper, right and left edges, a step #309 looks for the best one among thus obtained results. In this operation, the preference is given to the left and right edge data rather than to the upper and lower edge data, because the edge data of the left and right edges have higher reliability as the pupil edge is extracted by a time-sequential signal processing in the horizontal direction.

More specifically, the estimated error ER determined in the steps #305, #306 is so weighted as to become smaller than the actual value, and the smallest error ER is selected among four error values ER.

In the following description, it is assumed that the result excluding the lower edge is best.

A next step #310 executes a re-calculation 1 of the least square circle estimation.

This is achieved by adding the edge data of the excluded edge one by one to the previously selected result of calculation, and checking the variation in the estimated error. If said estimated error does not increase beyond a predetermined rate, the added edge data are considered proper and are maintained as added, but, if otherwise, the added edge data are considered improper and are excluded. This try-and-error operation is repeated for all the edge data of the initially excluded edge.

Figure 8B:
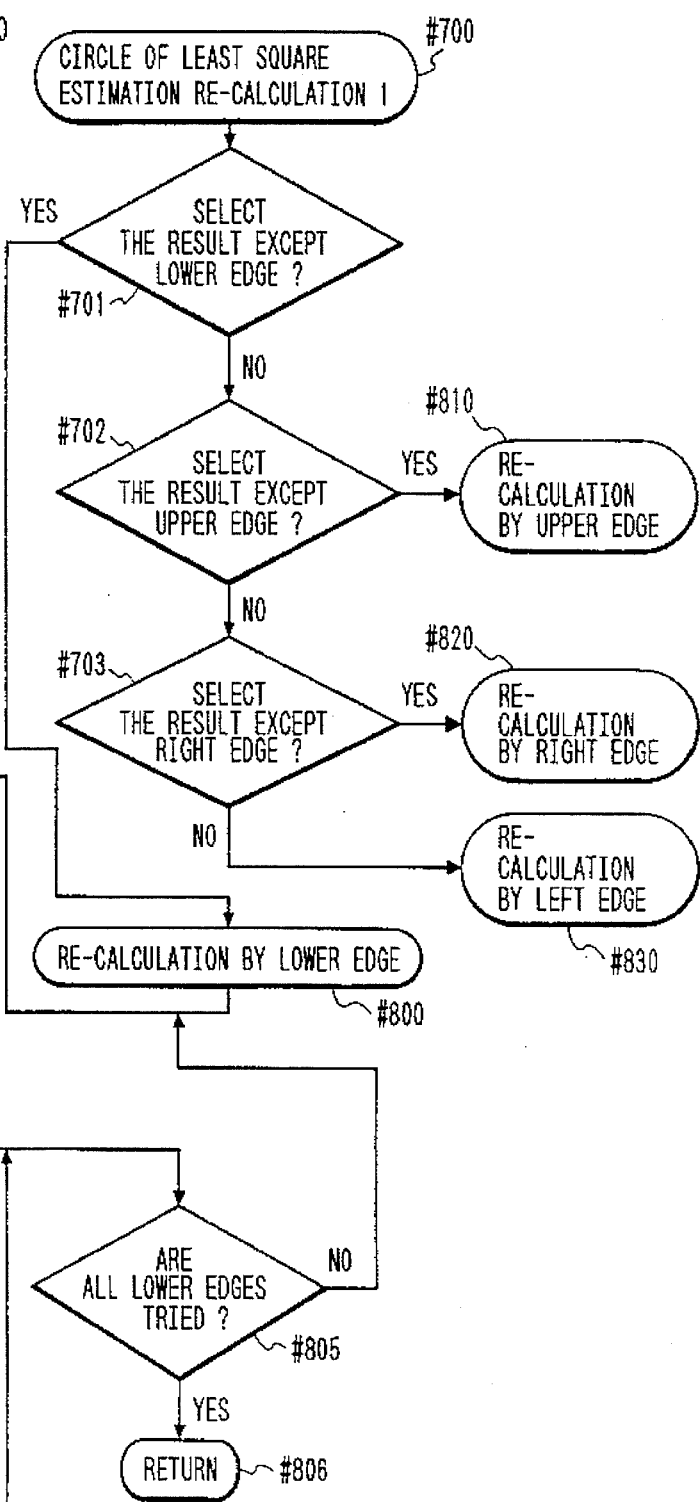
FIG. 8B is a flowchart of a re-calculation 1 of the least square estimation of the circle.

FIG. 8B is a flowchart of the re-calculation 1 of the least square circle estimation.

Since it is assumed in the present case that the estimated result without the lower edge is selected, the sequence proceeds from a step #701 to #800.

A next step #801 corrects the intermediate variables X1–X4 for the least square method according to the following equations:

$$X1 \rightarrow X1+xk \tag{42}$$

$$X2 \rightarrow X2+xk^2 \tag{43}$$

$$X3 \rightarrow X3+xk^3 \tag{44}$$

$$X4 \rightarrow X4+xk^4 \tag{45}$$

wherein (xk, yk) is one of the edge data of the lower edge. Similar calculations are executed also for the variables Y1–Y4 and Z1–Z4 (#801). Stated differently, these calculations correspond to the increase of an edge data in the least square method.

Then the estimated circle is calculated again with thus corrected intermediate variables (#802).

Then the ratio of the new estimated error ER to the error $ER_0$ prior to the data addition is calculated, and, if said ratio is small, satisfying the following relation:

$$(ER/ER_0) < Ca \tag{46}$$

the added edge data are considered true. The constant Ca is determined, for example, at about 1.1.

On the other hand, if said ratio or rate of increase is large, the added edge data are considered false, and the intermediate variables X1–X4, Y1–Y4 and Z1–Z4 and the results of the estimated circle are returned to the values prior to the addition of said edge data.

After the trial for an edge data, another edge data is tried. After the trials for all the initially excluded edge data (#805), it is considered that the proper edge data, among the initially excluded edge data, are effectively utilized in the estimation, and this subroutine is terminated (#806).

In the foregoing there has been explained the re-calculation 1 for the lower edge, but that for the upper, left or right edge can be executed in the identical manner, so that the flowchart and the description therefor are omitted.

When the proper pupil edge data are recovered in this manner by the re-calculation 1 of the least square circle estimation, the finally obtained estimated error ER is again compared with the error threshold value ERTHR (#311), and, if ER<ERTHR, the pupil detection is regarded as successful (#303) and the subroutine is terminated (#304).

On the other hand, if the estimated error is still large, the currently employed pupil edge data are considered to still contain false data, and such false data are excluded in the following process.

In the present case employing the combination of the upper, left and right edges but excluding the lower edge, steps #312, #315 and #316 execute a re-calculation 2B of the least square circle estimation concerning the upper edge. This subroutine is to exclude the false edge data, from the currently employed ones of the upper edge.

Figure 9:
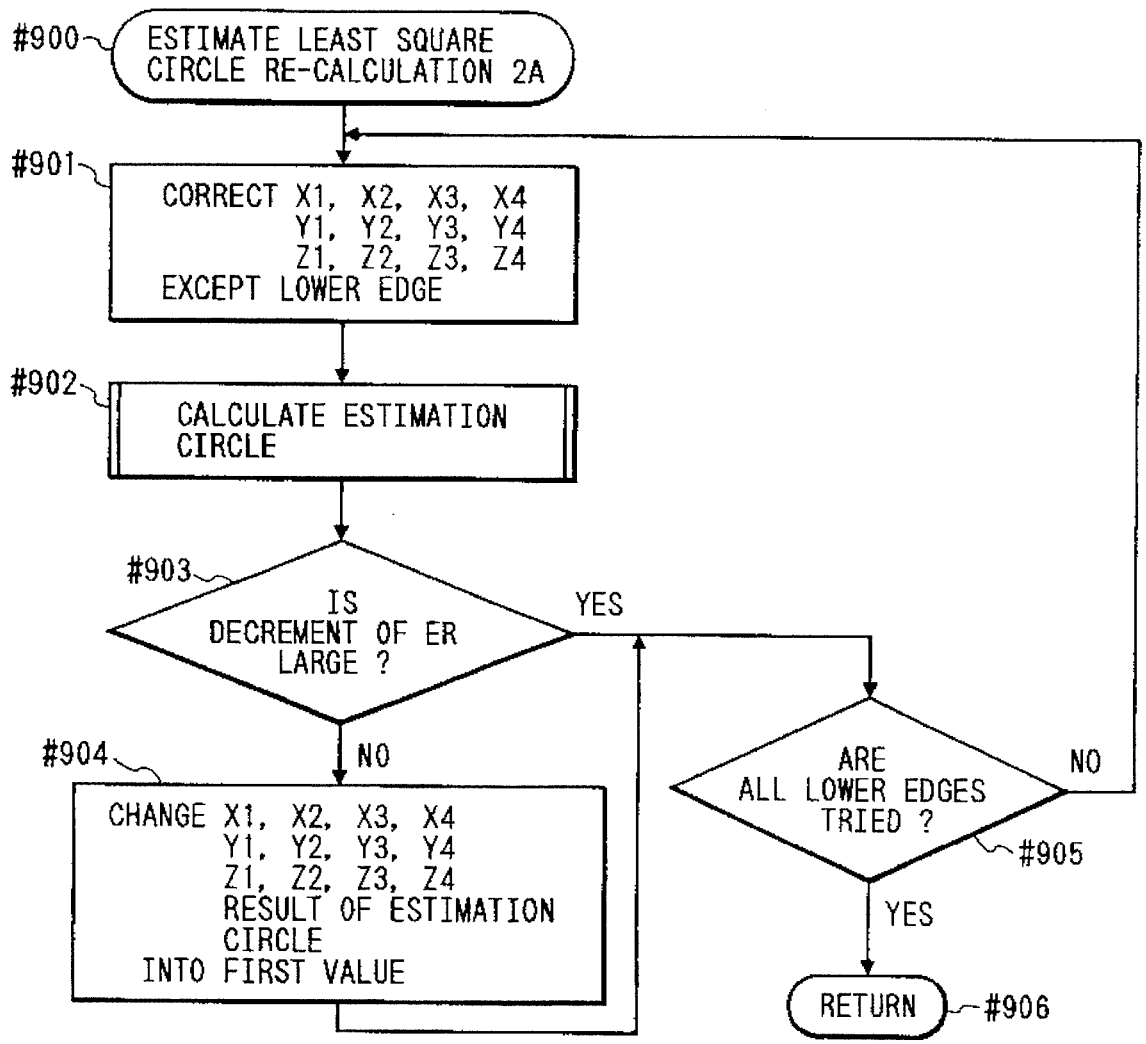
FIG. 9 is a flowchart of a re-calculation 2A of the least square estimation of the circle.

FIG. 9 is a flowchart of the re-calculation 2A of the least square circle estimation concerning the lower edge. Symbols 2A, 2B, 2C and 2D respectively correspond to the lower, upper, right and left edges.

In the following there is only explained the subroutine of re-calculation 2A for the lower edge, but said re-calculation for any of other edges can be conducted in the identical manner.

When said subroutine is called, the intermediate variables X1–X4, Y1–Y4, Z1–Z4 are in the following manner, corresponding to the exclusion of edge data (xk, yk) among those of the lower edge:

$$i\ X1 \rightarrow X1-xk \tag{47}$$

$$i\ X2 \rightarrow X2-xk^2 \tag{48}$$

$$i\ X3 \rightarrow X3-xk^3 \tag{49}$$

$$i\ X4 \rightarrow X4-xk^4 \tag{50}$$

The variables Y1–Y4, Z1–Z4 are also corrected in a similar manner.

After said correction of the intermediate variables, a next step #902 calculates the estimated circle. Thus obtained coordinates of the center, radius and estimated error of the estimated circle correspond to the remaining edge data, after exclusion of an edge data.

Then the variation rate in the estimated error is calculated according to the aforementioned relation (46) (#903), and, if the rate of decrease is larger than a predetermined value, the excluded edge data are regarded as false data and are maintained as excluded. On the other hand, if the rate of decrease is smaller, the excluded edge data are regarded as true data, and a step #904 returns the intermediate variables X1–X4, Y1–Y4. Z1–Z4 and the results of the estimated circle to the values prior to said exclusion of edge data.

As in the case of re-calculation 1, after the trials for all the edge data (#905), the present subroutine is terminated (#906).

Again referring to FIGS. 5A and 5B, when the re-calculation 2 for the upper edge is completed in the step #316, the finally obtained estimated error ER is compared with the error threshold value ERTHR (#317), and, if said error has become smaller, the pupil detection is regarded as successful (#303) and this subroutine is terminated (#304).

Figure 6:
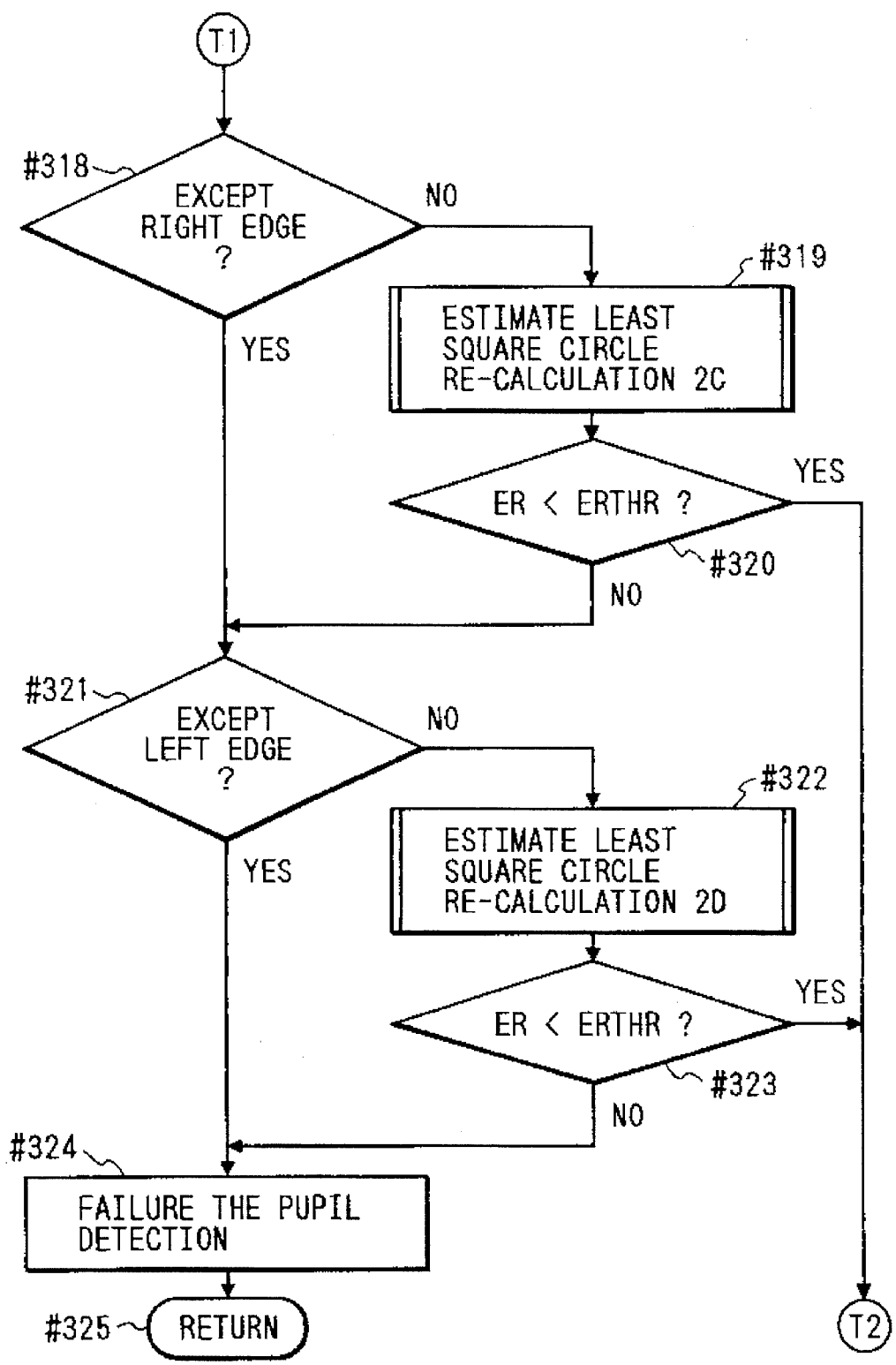
FIG. 6 is a flowchart showing a sequence after T1 in FIGS. 5A and 5B.

On the other hand, if the estimated error is still large, the sequence proceeds, through a branch T1, to the flowchart shown in FIG. 6 in which similar processes are executed for the edge data of the right and left edges. If the estimated error ER becomes smaller in the course of said processes, the sequence returns, through a branch T2, to the step #303 in FIGS. 5A and 5B, wherein the pupil detection is regarded as successful and the present subroutine is terminated (#304).

If the estimated error ER is still large even after the above-explained processes, the pupil detection is regarded as having failed (#324) and the subroutine is terminated (#325).

The above-explained processes will be further clarified with reference to FIGS. 13A to 13D. In an example of the eyeball image shown in FIG. 13A, the lower edge extraction of the pupil circle is erroneous because of the influence of the eyelid. Consequently the calculation with all the extracted edge data leads to an erroneous pupil circle 75 shown in FIG. 13B.

Figure 13A:
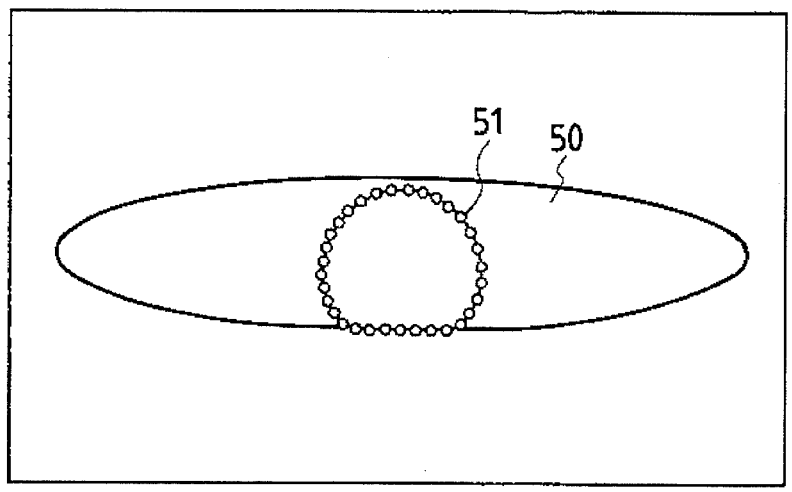
FIGS. 13A to 13D are views showing the detection of the pupil circle under the influence of an eyelid.
Figure 13B:
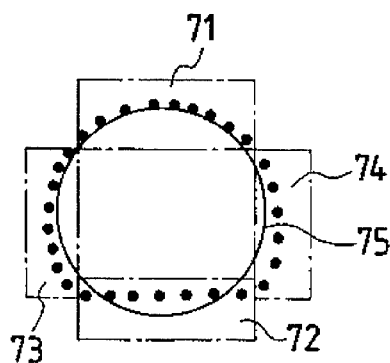
Figure 13C:
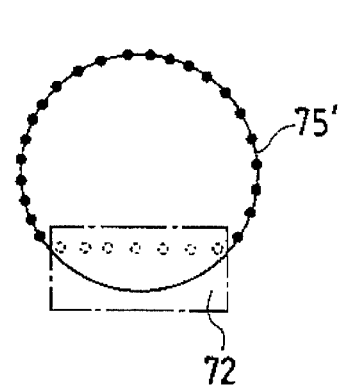
Figure 13D:
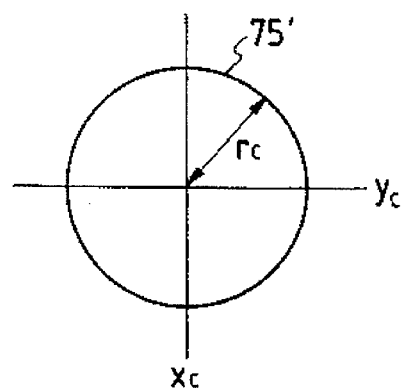

However, according to the method of the present invention, a proper pupil circle 75' shown in FIG. 13C can be obtained by estimation with edge data, excluding those of the lower edge in an area 72.

Figure 14A:
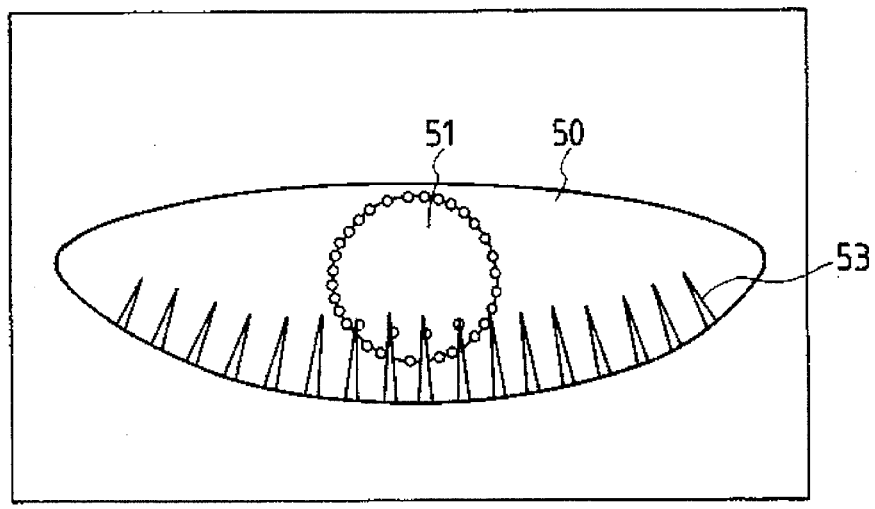
FIGS. 14A to 14D are views showing the detection of the pupil circle under the influence of eyelashes.

FIGS. 14A to 14D show the influence of eyelashes. In FIG. 14A, because of the presence of eyelashes 53, the edge data extracted in the lower side of the pupil contain false edge data.

Figure 14B:
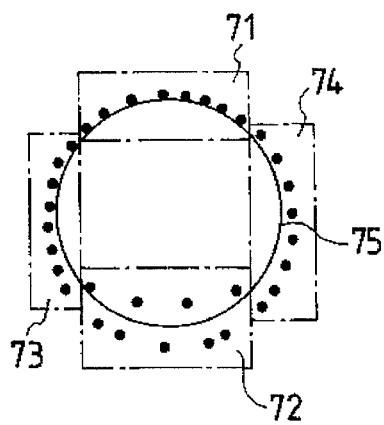

In FIG. 14B, a circle 75 estimated employing all the extracted edge data is therefore erroneous.

Figure 14C:
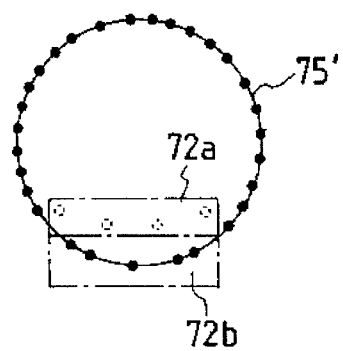
Figure 14D:
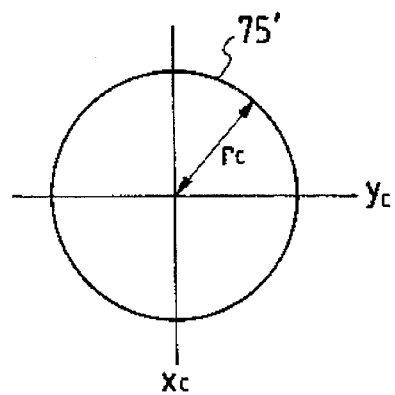

On the other hand, according to the method of the present invention, by classifying the edge data of the lower edge into proper data (area 72b) and false data (area 72a) as shown in FIG. 14C, a proper circle 75' can be obtained by estimation based on the proper edge data only.

In the foregoing embodiment, first-order equations are employed in the correction of the estimated error by means of the pupil radius, but there may also be employed correcting equations of higher order.

Also in said embodiment, since a circle is estimated by the least square method, the radius or diameter of the circle is used for correction, but it is also possible to estimate an oval for the pupil and to utilize the shorter or longer diameter or the average thereof for the correction.

What is claimed is:

1. A device for detecting a shape of a region of an eyeball, said device comprising:
    a) detection means for detecting boundary position information for a boundary between a first region and a second region of the eyeball, said boundary divided into areas that each include plural boundary position information, wherein the boundary between the first and second regions is substantially circular;
    b) selection means for selecting at least one area among the plurality of areas of the boundary detected by said detection means based on a predetermined threshold; and
    c) calculation means for estimating an external shape of the first region by utilizing the boundary position information for the area of the boundary selected by said selection means.

2. A device according to claim 1, wherein said first organism is a pupil, and said second organism is an iris.

3. A device according to claim 1, wherein said detection means is adapted to detect said boundary in directionally different plural groups.

4. A device according to claim 3, wherein said first organism is a pupil, and said second organism is an iris.

5. A device according to claim 3, wherein said calculation means is adapted to estimate said external shape of said first organism, by preferentially employing, among said boundary position information of said plural groups detected by said detection means, the boundary position information of the horizontal direction.

6. A device according to claim 4, wherein said calculation means is adapted to estimate said external shape of said pupil, by preferentially employing, among said boundary position information of said plural groups detected by said detection means, the boundary position information of the horizontal direction.

7. A device according to claim 1, wherein said calculation means is adapted to estimate said external shape by the least square method.

8. A device according to claim 6, wherein said calculation means is adapted to estimate said external shape by the least square method.

9. A device according to claim 1, wherein said detection means includes light receiving means for receiving an eyeball image, and is adapted to detect said boundary between said first and second organisms in said plural groups, by the output of said light receiving means.

10. A device according to claim 4, wherein said detection means includes light receiving means for receiving an eyeball image, and is adapted to detect said boundary between said pupil and said iris in said plural groups, by the output of said light receiving means.

11. A device according to claim 1, wherein said calculation means is adapted to estimate the outline of said first organism.

12. A device according to claim 2, wherein said calculation means is adapted to estimate the outline of said pupil.

13. A device according to claim 5, wherein said calculation means is adapted to estimate the outline of said first organism.

14. A device according to claim 6, wherein said calculation means is adapted to estimate the outline of said pupil.

15. A device according to claim 1, further comprising:
    sight line detecting means for detecting the line of sight of said eyeball, based on the information on the external shape of said pupil, estimated by said calculation means.

16. A device according to claim 2, further comprising:

sight line detecting means for detecting the line of sight of said eyeball, based on the information on the external shape of said pupil, estimated by said calculation means.

17. A device according to claim 5, further comprising:

sight line detecting means for detecting the line of sight of said eyeball, based on the information on the external shape of said first organism, estimated by said calculation means.

18. A device according to claim 6, further comprising:

sight line detecting means for detecting the line of sight of said eyeball, based on the information on the external shape of said pupil estimated by said calculation means.

19. A device according to claim 15, further comprising:

display means controlled according to the sight line information obtained by said sight line detecting means.

20. A device according to claim 16, further comprising:

display means controlled according to the sight line information obtained by said sight line detecting means.

21. A device according to claim 15, further comprising:

electromechanical conversion means controlled according to the information on the line of sight, obtained by said sight line detecting means.

22. A device according to claim 17, further comprising:

electromechanical conversion means controlled according to the information on the line of sight, obtained by said sight line detecting means.

23. A device for detecting a shape of a region of an eyeball, said device comprising:

a) detection means for detecting data indicative of a boundary between a first region and a second region of the eyeball, wherein the boundary is substantially circular;

b) first calculation means for calculating a respective estimated error of each of said plurality of boundary data;

c) determining means for determining which boundary data has the greatest effect on an overall estimated error associated with an estimated shape of the first region; and d) second calculation means for calculating an estimated external shape of the first region utilizing a portion of the boundary data excluding the boundary data having the greatest effect on the overall estimated error from said boundary data.

24. A device according to claim 23, wherein said determining means comprises means for selectively excluding different portions of the boundary data to form respective subsets of boundary data, means for calculating a plurality of shape estimates of the first region respectively based on the subsets of boundary data, means for determining an estimated error for each shape estimate, and means for selecting a subset of boundary data corresponding to the shape estimate having the lowest estimated error.

25. A device according to claim 24, wherein said means for calculating a plurality of shape estimates comprises means for reducing the estimated error for shape estimates that are based on a subset of boundary data including data from predetermined regions of the boundary.

26. A device according to claim 24, wherein said means for excluding selected portions of boundary data comprises means for excluding a portion of boundary data corresponding to one of an upper region, lower region, left region, and right region of the boundary.

27. A device according to claim 24, wherein the first region of the eyeball is a pupil region and the second region of the eyeball is an iris region.

28. A device according to claim 24, wherein said means for calculating the plurality of shape estimates uses a least square method.

29. A device according to claim 24, wherein said determining means further comprises means for selecting an excluded portion of boundary data corresponding to the selected subset of boundary data and means for designating the selected excluded portion as the boundary data having the greatest effect on the overall estimated error.

30. A device according to claim 24, wherein said determining means further comprises means for selecting an excluded portion of boundary data corresponding to the selected subset of boundary data, means for determining whether each data value in the excluded portion of boundary data satisfies a predetermined condition, and means for designating the data values that fail to satisfy the predetermined condition as the boundary data having the greatest effect on the overall estimated error.

31. A device according to claim 30, wherein said determining means further comprises means for selecting a portion of the selected subset of boundary data, means for determining whether each data value in the selected portion of the selected subset satisfies a different predetermined condition, and means for designating the data values that satisfy the predetermined condition and the data values in the excluded portion of boundary data as the boundary data having the greatest effect on the overall estimated error.

32. A device for detecting a line of sight of an eyeball, comprising:

a) detection means for detecting data indicative of a boundary between a first region and a second region of the eyeball, wherein the boundary is substantially circular;

b) first calculation means for calculating a respective estimated error of each of said plurality of boundary data;

c) estimating means for estimating an external shape of the first region by selectively utilizing a portion of the boundary data so that an overall estimated error associated with the shape estimate is below a predetermined threshold; and d) second calculation means for calculating a line of sight using the shape estimated by said estimating means.

33. A device according to claim 32, wherein said estimating means comprises determining means for determining the boundary data having the greatest effect on the overall estimated error and means for calculating a shape estimate utilizing the boundary data excluding the boundary data having the greatest effect on the overall estimated error.

34. A device according to claim 33, wherein said determining means comprises means for selectively excluding different portions of the boundary data to form respective subsets of boundary data, means for calculating a plurality of shape estimates of the first region respectively based on the subsets of boundary data, means for determining an estimated error for each shape estimate, and means for selecting a subset of boundary data corresponding to the shape estimate having the lowest estimated error.

35. A device according to claim 34, wherein said means for calculating a plurality of shape estimates comprises means for reducing the estimated error for shape estimates that are based on a subset of boundary data including predetermined portions of data.

36. A device according to claim 34, wherein said means for excluding selected portions of boundary data comprises means for excluding a portion of boundary data corresponding to one of an upper region, lower region, left region, and right region of the boundary.

37. A device according to claim 34, wherein the first region of the eyeball is a pupil region and the second region of the eyeball is an iris region.

38. A device according to claim 34, wherein said means for calculating the plurality of shape estimates uses a least square re method.

39. A device according to claim 34, wherein said determining means further comprises means for selecting an excluded portion of boundary data corresponding to the selected subset of boundary data and means for designating the selected excluded portion as the boundary data having the greatest effect on the overall estimated error.

40. A device according to claim 34, wherein said determining means further comprises means for selecting an excluded portion of boundary data corresponding to the selected subset of boundary data, means for determining whether each data value in the excluded portion of boundary data satisfies a predetermined condition, and means for designating the data values that fail to satisfy the predetermined condition as the boundary data having the greatest effect on the overall estimated error.

41. A device according to claim 40, wherein said determining means further comprises means for selecting a portion of the selected subset of boundary data, means for determining whether each data value in the selected portion of the selected subset satisfies a different predetermined condition, and means for designating the data values that satisfy the predetermined condition and the data values in the excluded portion of boundary data as the boundary data having the greatest effect on the overall estimated error.

42. A device according to claim 32, further comprising means for detecting a position of an image reflected from the eyeball, wherein said calculation means comprises means for calculating the line of sight based on the shape estimated by said estimating means and the detected position of the reflected image.

43. A device according to claim 32, wherein said means for detecting a reflected image comprises means for detecting a Purkinje's image.

44. A device for detecting a shape of a region of an eyeball, comprising:
a) detection means for detecting a plurality of boundary position information between a first region and a second region of the eyeball, wherein a boundary between the first region and the second region is substantially circular;
b) grouping means for dividing the detected plural boundary position information into a plurality of groups, each group consisting of a plurality of boundary position information;
c) selection means for selecting a group which satisfies a predetermined condition from among the plural groups; and
d) calculation means for estimating an external shape of the first region only based on the plurality of boundary position information included in the group selected by said selection means.

45. A device according to claim 44, wherein the first region is a pupil portion of the eyeball and the second region is an iris portion of the eyeball.

46. A device according to claim 44, wherein said grouping means divides the boundary between the first region and the second region into a horizontal direction and a vertical direction, and performs group dividing.

47. A device according to claim 46, wherein the predetermined condition of said selection means is set in order to select by preferentially employing a group in the horizontal direction among the plural groups.

48. A device according to claim 44, wherein said calculation means estimates the external shape by utilizing a least square method.

49. A device according to claim 44, wherein said detection means have light receiving means for receiving an eyeball image and detects the boundary position information dividing the first region and the second region according to an output from the light receiving means.

50. A device according to claim 44, wherein said calculation means estimates an outline of a pupil portion of the eyeball.

51. A device according to claim 45, wherein said calculation means estimates an outline of the pupil portion.

52. A device according to claim 44, further comprising line of sight detection means for detecting line of sight of the eyeball based on information of the external shape of the first region estimated by said calculation means.

53. A device according to claim 52, further comprising display means to be controlled according to line of sight information obtained by said line of sight detection means.

54. A device according to claim 52, further comprising electro-mechanical energy conversion means to be controlled by line of sight information obtained by said line of sight detection means.

55. A device for detecting a shape of a region of an eyeball, comprising:
a) detection means for detecting plural boundary position information between a first region and a second region of the eyeball, wherein a boundary between the first region and the second region is substantially circular;
b) grouping means for dividing the detected plural boundary position information into a plurality of groups, each group consisting of plural boundary position information;
c) first calculation means for estimating an external shape of the first region by selectively excluding one of the groups among the plurality of groups, said first calculation means changing the group to be excluded and performing the calculation a plurality of times; and
d) first evaluation means for evaluating a reliability of the respective external shape of the first region estimated by said first calculation means for each calculation;
wherein a shape of the region of the eyeball is detected by utilizing at least the plural boundary position information included in the plural groups which said first evaluation means evaluates as having the highest reliability.

56. A device according to claim 55, wherein the first region is a pupil portion of the eyeball and the second region is an iris portion of the eyeball.

57. A device according to claim 55, wherein said calculation means estimates the external shape by utilizing a least square method.

58. A device according to claim 55, wherein said calculation means estimates an outline of a pupil portion of the eyeball.

59. A device according to claim 56, wherein said calculation means estimates an outline of the pupil portion.

60. A device according to claim 55, wherein said detection means have light receiving means for receiving an eyeball image and detects the boundary position information between the first region and the second region according to an output from the light receiving means.

61. A device according to claim 55, further comprising second evaluation means for evaluating again the reliability of the respective plural boundary position information included in the excluded group when said first evaluation means evaluates the highest reliability; and second calculation means for estimating again the external shape of the first region by utilizing the plural boundary position information of the plural groups of which said first evaluation means evaluates the highest reliability and by utilizing the boundary position information of the excluded groups of which said second evaluation means evaluates high reliability among the excluded groups.

62. A device according to claim 61, further comprising line of sight detection means for detecting line of sight of the eyeball based on the external shape of the first region estimated by said second calculation means.

63. A device according to claim 62, further comprising display means to be controlled according to line of sight information obtained by said line of sight detection means.

64. A device according to claim 62, further comprising electro-mechanical energy conversion means to be controlled according to the line of sight information obtained by said line of sight detection means.

65. A device for detecting a shape of a region of an eyeball, comprising:

a) detection means for detecting plural boundary position information between a first region and a second region of the eyeball, wherein a boundary between the first region and the second region is substantially circular;

b) calculation means for estimating an external shape of the first region based on the plural boundary position information;

c) determining means for determining a reliability of the plural boundary position information based on whether the respective boundary position information included in the plural boundary position information is located at the same circumference; and d) changing means for changing determination criterion of said determining means based on a size of the external shape of the first region estimated by said calculation means.

66. A device according to claim 65, wherein the first region is a pupil portion and the second region is an iris portion.

67. A device according to claim 65, wherein said calculation means estimates the external shape by utilizing a least square method.

68. A device according to claim 65, wherein said detection means divide the plural boundary position information into plural groups and detects the information, and said determination means determines a reliability of each group.

69. A device according to claim 68, wherein said calculation means excludes the group of which reliability is determined as low by said determination means and estimates again the external shape of the first region.

70. A device according to claim 65, wherein said detection means have light receiving means for receiving an eyeball image and detects the boundary position information between the first region and the second region according to an output from the light receiving means.

71. A device according to claim 65, wherein said second calculation means estimates an outline of a pupil region of the eyeball.

72. A device according to claim 66, wherein said second calculation means estimates an outline of the pupil portion.

73. A device according to claim 65, further comprising line of sight detection means for detecting line of sight of the eyeball based on information of the external shape of the first region estimated by said calculation means.

74. A device according to claim 73, further comprising display means to be controlled according to line of sight information obtained by said line of sight detection means.

75. A device according to claim 73, further comprising electro-mechanical energy conversion means to be controlled according to line of sight information obtained by said line of sight detection means.

* * * * *

UNITED STATES PATENT AND TRADEMARK OFFICE
CERTIFICATE OF CORRECTION

PATENT NO. : 5,543,887
DATED : August 6, 1996
INVENTOR(S) : AKIRA AKASHI

It is certified that error appears in the above-indentified patent and that said Letters Patent is hereby corrected as shown below:

At [57] Abstract

Line 2, "device" (second occurrence) should be deleted.

Column 1

Line 26, "(IRED's)" should read --(IREDs)--.
Line 37, "IRED's" should read --IREDs--.

Column 5

Line 8, "LED's" should read --LEDs--.

Column 11

Lines 9 to 14,

"       X1—>X1-X1'        (38)
        X2—>X2-X2'        (39)
        X3—>X3-X3'        (40)
        X4—>X4-X4'        (41)        "

should read

--      X1<—X1-X1'        (38)
        X2<—X2-X2'        (39)
        X3<—X3-X3'        (40)
        X4<—X4-X4'        (41)        --.

UNITED STATES PATENT AND TRADEMARK OFFICE
CERTIFICATE OF CORRECTION

PATENT NO. : 5,543,887          Page 2 of 4
DATED : August 6, 1996
INVENTOR(S) : AKIRA AKASHI It is certified that error appears in the above-indentified patent and that said Letters Patent is hereby corrected as shown below:

Column 11

Lines 65 to 67,

"     $X1 \longrightarrow X1+xk$          (42)

$X2 \longrightarrow X2+xk^2$          (43)     "

should read

--    $X1 \longleftarrow X1+xk$          (42)

$X2 \longleftarrow X2+xk^2$          (43)     --.

Column 12

Lines 1 to 3,
"     $X3 \longrightarrow X3+xk^3$          (44)

$X4 \longrightarrow X4+xk^4$          (45)     "

should read

--    $X3 \longleftarrow X3+xk^3$          (44)
      $X4 \longleftarrow X4+xk^4$          (45)     --.

UNITED STATES PATENT AND TRADEMARK OFFICE
CERTIFICATE OF CORRECTION

PATENT NO. : 5,543,887          Page 3 of 4
DATED      : August 6, 1996
INVENTOR(S): AKIRA AKASHI It is certified that error appears in the above-indentified patent and that said Letters Patent is hereby corrected as shown below:

Column 12

Lines 58 to 64,

"   i $X1 \longrightarrow X1-xk$   (47)
   i $X2 \longrightarrow X2-xk^2$   (48)
   i $X3 \longrightarrow X3-xk^3$   (49)
   i $X4 \longrightarrow X4-xk^4$   (50)   "

should read

--   $X1 \longleftarrow X1-xk$   (47)
   $X2 \longleftarrow X2-xk^2$   (48)
   $X3 \longleftarrow X3-xk^3$   (49)
   $X4 \longleftarrow X4-xk^4$   (50)   --.

UNITED STATES PATENT AND TRADEMARK OFFICE
CERTIFICATE OF CORRECTION

PATENT NO. : 5,543,887
DATED : August 6, 1996
INVENTOR(S) : AKIRA AKASHI

It is certified that error appears in the above-indentified patent and that said Letters Patent is hereby corrected as shown below:

Column 17

Line 12, "re" should be deleted.
    Line 43, "claim 32," should read --claim 42,--.

Column 20

Line 13, "divide" should read --divides--.

Signed and Sealed this

Seventh Day of January, 1997

Attest:

BRUCE LEHMAN

Attesting Officer          Commissioner of Patents and Trademarks

UNITED STATES PATENT AND TRADEMARK OFFICE
CERTIFICATE OF CORRECTION

PATENT NO. : 5,543,887
DATED : August 6, 1996
INVENTOR(S) : Akira Akashi

It is certified that error appears in the above-indentified patent and that said Letters Patent is hereby corrected as shown below:

Column 1, line 14, "U.S. Ser. No. 327,784" should read --U.S. Patent No. 5,486,892--

Signed and Sealed this

Twenty-fifth Day of February, 1997

Attest:

BRUCE LEHMAN

Attesting Officer    Commissioner of Patents and Trademarks